(12) United States Patent
    Cross

(10) Patent No.: US 9,869,575 B2
(45) Date of Patent: Jan. 16, 2018

(54) CONSTRUCTIBLE UTENSILS

(71) Applicant: EcoTensil Inc., Corte Madera, CA (US)

(72) Inventor: Peggy V. K. Cross, Larkspur, CA (US)

(73) Assignee: EcoTensil Inc., Corte Madera, CA (US)

( * ) Notice: Subject to any disclaimer, the term of this patent is extended or adjusted under 35 U.S.C. 154(b) by 0 days.

(21) Appl. No.: 15/092,895

(22) Filed: Apr. 7, 2016

(65) Prior Publication Data

US 2016/0341590 A1    Nov. 24, 2016

Related U.S. Application Data

(63) Continuation of application No. 14/695,039, filed on Apr. 23, 2015, now abandoned, which is a continuation-in-part of application No. 14/214,988, filed on Mar. 16, 2014, now abandoned, and a continuation-in-part of application No. 14/214,992, filed on Mar. 16, 2014, now abandoned, and a continuation-in-part of application No. 14/214,993, filed on Mar. 16, 2014, and a continuation-in-part of application No. 14/032,194, filed on Sep. 19, 2013, now abandoned.

(60) Provisional application No. 61/794,613, filed on Mar. 15, 2013, provisional application No. 61/794,880, filed on Mar. 15, 2013, provisional application No. 61/786,434, filed on Mar. 15, 2013, provisional application No. 61/712,610, filed on Oct. 11, 2012.

(51) Int. Cl.
    *B41F 19/02*     (2006.01)
    *G01F 19/00*     (2006.01)
    *B65D 51/24*     (2006.01)
    *B65D 77/24*     (2006.01)

(52) U.S. Cl.
    CPC ......... *G01F 19/002* (2013.01); *B65D 51/246* (2013.01); *B65D 51/247* (2013.01); *B65D 77/245* (2013.01)

(58) Field of Classification Search
    CPC .................................................. A47G 19/03
    USPC .......................................................... 101/17
    See application file for complete search history.

(56) References Cited

U.S. PATENT DOCUMENTS

| | | | | |
|---|---|---|---|---|
| 552,350 | A * | 12/1895 | Davenport | F16C 37/00 384/321 |
| 652,350 | A * | 6/1900 | Davenport | A47F 13/08 294/180 |
| 2,375,266 | A * | 5/1945 | Wilson | B65D 51/246 229/125.03 |
| 2,453,393 | A * | 11/1948 | Wilson | A47G 21/04 215/228 |
| 4,060,176 | A * | 11/1977 | Tobiasson | A47G 21/04 206/217 |
| 4,641,752 | A * | 2/1987 | Palffy | A47G 19/03 206/525 |

(Continued)

FOREIGN PATENT DOCUMENTS

GB    2249470 A *  5/1992  .......... E01H 1/1206

*Primary Examiner* — Anthony Nguyen
(74) *Attorney, Agent, or Firm* — Patent Law Offices Michael E. Woods; Michael E. Woods

(57) ABSTRACT

A system and method for a constructible scoop that overcomes the disadvantages of conventional preformed scoops that are shipped in association with a scoopable product. A constructible scoop may be protected and provided outside of the product-containing-volume where it is easily located and sealed to be sanitary prior to first use.

12 Claims, 27 Drawing Sheets

(56) References Cited

U.S. PATENT DOCUMENTS

| | | | | |
|---|---|---|---|---|
| 2003/0222465 A1* | 12/2003 | Fonfrias | ................ | E01H 1/1206 294/1.3 |
| 2005/0258655 A1* | 11/2005 | Matthews | ............. | E01H 1/1206 294/1.3 |
| 2009/0205209 A1* | 8/2009 | Tovar | ..................... | A47G 21/04 30/324 |
| 2010/0194128 A1* | 8/2010 | Langley | ............... | A01K 23/005 294/1.3 |

* cited by examiner

ECOTASTER with BACKSTOP

CONSTRUCTIBLE UTENSILS

CROSS REFERENCE TO RELATED APPLICATIONS

This application is a Continuation of U.S. patent application Ser. No. 14/695,039 filed on 23 Apr. 2015 which is a Continuation-in-part of application Ser. No. 14/214,988 filed on Mar. 16, 2014. Application Ser. No. 14/214,988 claims the benefit of U.S. Provisional Application 61/794,613 filed on Mar. 15, 2013. This application is a Continuation-in-part of application Ser. No. 14/214,992 filed on Mar. 16, 2014. Application Ser. No. 14/214,992 claims the benefit of U.S. Provisional Application 61/794,880 filed on Mar. 15, 2013. This application is a Continuation-in-part of application Ser. No. 14/214,993 filed on Mar. 16, 2014. Application Ser. No. 14/214,993 claims the benefit of U.S. Provisional Application 61/786,434 filed on Mar. 15, 2013. This application is a Continuation-in-part of application Ser. No. 14/032,194 filed on Sep. 19, 2013. Application Ser. No. 14/032,194 claims the benefit of U.S. Provisional Application 61/712,610 filed on Oct. 11, 2012, the contents of which are all hereby expressly incorporated by reference thereto in their entireties for all purposes.

FIELD OF THE INVENTION

The present invention relates generally to utensils, service implements, and devices, and more specifically, but not exclusively, to constructible utensils and implements formed from planar stock.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Constructible utensils are increasingly being adopted by industry and consumers for a wide range of uses and applications in addition to environmentally-friendly eating utensils.

Products are often delivered in a powdered (or other "scoopable") format shipped in a container defining a closed cylindrical or rectilinear volume. For consumer products, these products are typically consumed in specific portion sizes. Manufacturers and/or distributors will often aid the consumer in identifying the specific portion sizes by providing a scoop or a measuring cup of the appropriate volume. Sometimes there are different dispensation options with different associated volumes. In which case, the scoop or the measuring cup may be provided with volume-indicating demarcations so the user/consumer is able to measure the appropriate/desired volume of powder. Some users/consumers rely on these shipped scoops for proper use of the material.

When provided, such scoops and measuring cups are frequently not environmentally-friendly being manufactured of plastic and other non-environmentally friendly materials. As users and consumers are increasingly looking for environmentally-friendly products, those scoops and measuring cups are less desirable to the consumer.

A further issue arises that in some contexts is more important. A conventional scoop and measuring cup, as they are pre-formed into their volume-capturing configuration, are not easily packaged for shipment and storage in association with the product container. A common solution is to add the scoop or measuring cup into the material-containing-volume of the container after it has been filled with the product. The container is then shipped and stored with the scoop or measuring cup inside. During shipment it is common for the scoop or measuring cup to become buried within the product. A user is required to "fish" within the container to locate and retrieve the scoop or measuring cup. Depending upon the dimensions of the container this may not be a trivial task, particularly when the scoop or measuring cup is deeply buried.

This is problematic on several fronts. In some cases users are discouraged when they cannot locate the scoop or measuring cup. In some cases the user may believe that the container was shipped without the scoop or measuring cup. This belief, even in cases when the scoop or measuring cup is present, can lead to complaints and mistaken criticisms of the product and manufacturer/distributor.

Further, for some types of product, e.g., infant formula, the user does not desire to use their hand/fingers or a foreign object to search the container volume for the scoop or measuring cup. For these users, the unavailability of the scoop or measuring cup in a convenient and sanitary manner is unacceptable.

Manufacture of the product category sometimes referred to as a constructible utensil category is maturing. Many conventional folding spoons have usability or manufacturability issues that do not scale when making 100's to 10,000's units per minute, or even greater numbers in shorter periods of time. At current market conditions, for a single-use tasting constructible utensil, such quantities are necessary to be competitive irrespective that a single-use tasting constructible utensil may be certified to meet current compostability standards, consumer concerns, and is thus better environmentally than a plastic mini-spoon, among other advantages.

A manufacturing technique for constructible utensils uses a sheet-fed printing process as it is very good at manufacturing and managing low quantities of constructible utensils. And in its infancy, market demand could be met by sheet-fed printing. As the market has been informed and as many retailers change their standards realizing the potential advantages of paperstock constructible utensils of all types in general, and especially for a small single-use tasting constructible utensil, market demand continues to increase. A limitation on greater market acceptance from retailers can be unit cost, so manufacturing techniques are needed to cost-reduce the constructible utensil so it can gain greater entry into food tasting applications that had been reserved for small plastic spoons.

The sheet-feed printing process includes several steps for transforming a large roll of special paperstock from a mill into bundles of organized constructible utensils suitable to be delivered to distributors and retailers. Those steps include the following elements (some of which may be combined together in different steps): 1) conversion of the sheet into individual sheets; 2) feeding the sheets into a stop/go printing process that adds content, 3) die stamping process that cuts out individual constructible utensils while adding or otherwise forming the score pattern; and 4) gathering and packaging the individual utensils into the proper size. After the die stamping, the individual constructible utensils are detached from the sheet (but may need to be mechanically punched out by machine or hand) and collected into the requisite number of units to be shrink-wrapped and delivered.

Market acceptance also includes consumer acceptance, that is acceptance by the person who actually takes the constructed utensil loaded with a portion of foodstuff and using the loaded constructed utensil to deliver the foodstuff into the mouth for consumption. The mouth is quite sensitive and a constructible utensil needs to be free from any and all sharp protrusions on the part of the constructed utensil that enters into the mouth or portion that the user may lick with the tongue. The mouth and tongue are sensitive to very small of irregularities and a sharp protrusion can severely reduce consumer acceptance which will have a negative impact on the retailer purchasing and using such a constructible utensil.

It is well-known that food manufacturers prepare and deliver foodstuff within a food container. In some cases, consumers require or desire a utensil to assist in consumption of the foodstuff from within the container. It has been a challenge to manufacturers to reliably deliver utensils to the consumer along with the foodstuff while ensuring that they remain sanitary.

One solution that works for certain food containers has been disclosed in U.S. Pat. No. 8,210,381 which describes a constructible utensil that is integrated or attached to a food cover for a food container, sometimes referred to as a "spoon lid"—this patent is expressly incorporated in its entirety by reference thereto for all purposes. It is not always possible or preferred to provide a constructible utensil as integrated with or attached to the food cover.

As market acceptance for constructible utensils increases, alternative designs and implementations offer retailers and consumers more choices to further increase market acceptance (including functions, cost, and ease of use).

Sustainability, recyclability, compostability are becoming increasingly important to retailers and consumers. However, not everyone uses the terms correctly—marketers sometimes use these indiscriminately and vaguely, often to the frustration of environmentally and socially conscious manufacturers, retailers, and users who desire more accuracy. Increasingly standards for sustainability are being developed and used to help retailers and consumers avoid "green washing" for the products that they buy and use.

For true ecological friendliness, materials and products meet specific, ever-evolving standards and requirements. The "green" world employs a special lexicon, particularly for words such as degradable, biodegradable, recyclable, sustainable, and compostable.

Degradable plastics are oil based and break down through chemical reactions rather than the activity of micro-organisms, so they can degrade in an anaerobic environment into water, $CO_2$, biomass, and trace elements. For example, the term "biodegradable" by itself does not mean much when biodegradable plastics and some types of biodegradable spoons include products that may take 100's to 1,000's of years to degrade. Since "biodegradable" specifies NO time limits, for the purposes of composting and sustainability "biodegradable" is often a meaningless term if not an imprecise term.

To be considered compostable, plastic material must break down within 180 days in a commercial compost facility. Biodegradable plastic has no time limit. According to the American Society for Testing & Materials (e.g., ASTM D6400-2004 "Standard Specification for Compostable Plastics," ASTM International, West Conshohocken, Pa., 2003, DOI: 10.1520/D6400-04, hereby expressly incorporated by reference thereto in its entirety for all purposes), for plastic to be considered as compostable, it must be able to break down into carbon dioxide, water, and biomass at the same rate as paper. It also needs to look like compost, should not produce any toxic material and should be able to support plant life. Compostable items are made from plant materials such as corn, potato, cellulose, soy, sugar, and the like.

Another important ASTM standard is ASTM D6868-2011 "Standard Specification for Labeling of End Items that Incorporate Plastics and Polymers as Coatings or Additives with Paper and Other Substrates Designed to be Aerobically Composted in Municipal or Industrial Facilities," ASTM International, West Conshohocken, Pa., 2003, DOI: 10.1520/D6868-11, also hereby expressly incorporated by reference thereto in its entirety for all purposes. This specification establishes the requirements for labeling of materials and products (including packaging), wherein a biodegradable plastic film or coating is attached (either through lamination or extrusion directly onto the paper) to compostable substrates and the entire product or package is designed to be composted in municipal and industrial aerobic composting facilities within 180 days.

The term compostable until recently was subject to some ambiguity. Certifications and representations of compostability most often reference commercial/municipal composting facilities that precisely control the environment (e.g., temperature) and microbes (e.g., periodic infusion of appropriate quantities of the appropriate microbes). Few bio-based utensils are certified compostable, and most include varying amounts of plant based starch and petroleum and take over the required 180 days or more to compost under the best of conditions. Home composting is rarely an option for these materials. Some "biodegradable" products like Taterware may take years—compost facilities either disallow all bioplastic utensils or pick them out of the compost at the end of the composting process.

Consumers have become increasingly skeptical of certain claims as to the various "green" attributes of various manufacturers and products since the introduction of "biodegradable plastics" in the late 1980s. Although touted as "environmentally friendly," many so-called biodegradable plastic products did not compost as implied. And yet manufacturers of these products were able to make claims of biodegradable because no scientifically based definitions, test methods and standards existed. Promulgation, adoption, and use of the ASTM specifications, definitions, and tests mentioned above provide a standard by which products and materials may be evaluated. To this end, there are organizations that provide certification of conformance to one or more of these standards as appropriate. For example, the Biodegradable Products Institute, 331 West 57th Street, Suite 415, New York, N.Y. 10019 has created a "compostable logo" which is designed to help remove some of the confusion for consumers. The Compostable logo builds credibility and recognition for products that meet the ASTM D6400 and/or D6868 standards so consumers, composters, regulators, and others can be assured that the product will compost as expected.

As consumers, composters, waste scavengers, regulators, and others continue to develop the technologies and processes for efficiently handling and sorting consumer waste, consumers and businesses (collectively purchasers) are on the front line and make important decisions. The decisions include selection, use, and, disposal of products. Selection is important, based upon a purchaser's understanding the degradability of the product and, as noted above, can be improved by certifications informing a purchaser of the attributes of a product. Additionally, based upon experience and history that the purchaser has with particular products, the purchaser may be influenced towards selection or use. This is important with utensils designed for foodstuffs—how the utensil feels in the mouth of the user is important. Coatings, sharp edges, dimensions, sturdiness, and the like all play a part in selection and use.

After selection and use, the user decides on, or initiates/influences, post-use handling. It is not always clear to the user whether a product is recyclable, compostable, or should be included as trash. Users are often confronted with a multitude of bins with disposal options. For some products, it is problematic to select the wrong receptacle. And the propriety is not just a simple matter of knowing the characteristics of the product—one sometimes needs to know the specifics of the processing used by the disposal/recycling/scavenging entity to match a product to the right process capabilities of recycler/scavenger. This can be overwhelming to a user and can produce undesirable outcomes for the intended "green" behavior. For example, many petroleum-based utensils are recyclable, and most bio-based plastics are NOT recyclable. Most users cannot readily distinguish one composition from another to allow them to properly manage the product, even if they were current as to the recycling capabilities of the local processor.

As varying compositions of consumer-products are introduced, the user becomes increasingly confused as to which the product that they want to process is recyclable and how to quickly and error-free sort the various products. Some "green" conferences have recycling advisors stationed at waste collecting areas to help educate users. This can seem overly complicated to some users, especially to users that are infrequently confronted with these options. This interferes with adoption and enjoyment of the advantages offered by compostable constructible utensils.

There are many instances where single-use products are currently used for tasting and consuming foodstuffs. Mostly these products are made from a plastic or a bio-material that is not, or insufficiently, compostable and easily bio-degradable. These products typically come preformed into the recommended configuration for use by the user.

To compound the problem, there are many venues in which utensils are single-use (e.g., foodstuff tasting/dispensing utensils or single-serving disposable utensils). Not only is the sorting/processing problem multiplied by the sheer volume of these products used world-wide, they also use up too many resources. This is because these products also have the further undesirable characteristic of attempting to emulate conventional multi-use utensils in their construction and arrangement which results in poor packing density. Manufacturers, distributors, and retailers are increasingly concerned about cube utilization (amount of product that can be shipped/stored in a specific cubic volume). The less efficient the cube utilization, particularly as compared to alternative products, the more costly it becomes to ship and warehouse.

It is not always the case that a utensil design scales well as seen in many "mini" tasting spoons that yield a bowl that is often too small and shallow for properly supporting, dispensing, and consuming adequate serving sizes of a range of foodstuff. Both the retailer and the end-user can become frustrated by this. Sometimes the design is further altered after scaling which results in more material and often a worse associated cube utilization parameter. Not only can these products be inefficient, such products often take up an unnecessarily large amount of space in the preformed configurations while being inefficient and costing more. It is understandable as preformed configurations in consumer-familiar designs is believed to maximize strength while minimizing user complexities. (In this context, preformed generally excludes constructible devices as the product is preformed at the time of manufacturing into the format deployed to the retailer and used by the user.

Compounding the problem even further, bioplastics use more material in their construction because they do not have the same material properties (e.g., tensile strength of bio-material versus stainless steel versus conventional petroleum-based plastic). There are many disadvantages to conventional tasting/single-use utensils, particularly to those attempting to be truly environmentally-friendly.

Currently there are several "green" factors that can be independently evaluated which include: recyclable, renewable, compostable, and sustainable, and usage of material efficiency and cube utilization efficiency for volume and weight). A product and processes that measure favorably against these factors while being friendly, convenient, effective, and efficient for the retailer, consumer and waste processor is preferred.

There are many needs for constructible utensils, including without limitation:
A) a system and method for a constructible scoop that overcomes the disadvantages of conventional preformed scoops that are shipped in association with a scoopable product;
B) a system and method for high-speed manufacturing of market-acceptable constructible utensils;
C) a system and method for associating a constructible utensil with a container; and
D) a system and method for meeting market demand for better constructible utensils.

BRIEF SUMMARY OF THE INVENTION

Disclosed are systems and methods for constructible utensils that meet one or more of the identified needs, in addition to other needs and offering other advantages, including: a) a scoop that overcomes the disadvantages of conventional preformed scoops that are shipped in association with a scoopable product; b) system and method for high-speed manufacturing of market-acceptable constructible utensils; c) system and method for associating a constructible utensil with a container; and d) a system and method for meeting market demand for better constructible utensils.

The following summary of the invention is provided to facilitate an understanding of some of technical features related to constructible utensils, scoops and measuring cups, high-speed rotary printing of constructible utensils, utensil association, and improved utensil architecture, as well as related to constructible utensils, particularly to those used as a spoon/utensil lid or single-use tasters integrated with, or deployed cooperatively with a foodstuff container, and is not intended to be a full description of the present invention. A full appreciation of the various aspects of the invention can be gained by taking the entire specification, claims, drawings, and abstract as a whole. The present invention is applicable to other product format types and product delivery mechanisms, applicable to other constructible utensils for non-foodstuff, as well as to high-quantity constructible paper products other than utensils and other web-fed construction systems; and applicable to other container shapes and sizes in addition to those illustrated and described.

Embodiments of the present invention address shortcomings of conventional solutions for shipping a "scoop" with a container of scoopable material. The constructible scoop may be affixed to the outside of the container, sealed in a sanitary covering, disposed under a lid, or otherwise affixed to the shipping format without being placed loose and/or exposed within the product-containing volume of the container. Thus the scoop will not become buried and lost or difficult to retrieve. The constructible scoop may be made from environmentally-friendly materials, and in some implementations it may be made compostable in compliance with current compostable standards.

A system may use a thin-walled plastic cup container with a stiffer paperboard overwrap. A constructible utensil is integrated into this overwrap. A free end of the wrap overlaps and covers the utensil-end of the overwrap, so that the utensil is protected. The overwrap is sealed at the free end with an easy to release adhesive, so that the consumer would pull back the overwrap to expose the utensil. The utensil would be perforated on the overwrap, so the consumer could easily remove it for use. There is an option for more copy under the overwrap as well.

A deformable sheet defines a handle and an operational element in which one or more scores, both straight and curved, are cooperatively provided on the sheet. The one or more scores enable deformation of the handle and/or operational element(s) to convert the structure into a strong, sturdy, and functional implement sufficient to meet the required application. In the preferred embodiment, the unconstructed utensil is provided on a planar sheet made of the requisite material (i.e., an appropriately green/sustainable material) that may be processed to enhance function (e.g., coated with environmentally appropriate material) to resist premature degradation during use (e.g., a moisture-barrier) or it may be manufactured of a moisture-barrier material (e.g., calcium carbonate), collectively a coating, or inherent characteristic or other moisture protection system is referred to as moisture-barrier property. Thus, quantities of the unconstructed material achieve a far greater packing density as compared to pre-constructed utensils, which saves money on shipping and storage because of the smaller cube size. For many applications, the handle and operational elements are minimalist in material cost while maximizing structural strength and user-experience consistent with the intended use all the while having a smaller carbon footprint.

The handle, typically with a curved score that defines a folding axis, is operated by bringing portions closer together out of the plane (e.g., folding or otherwise deforming) the handle along the one or more handle scores. This folding induces a responsive distortion/deformation of the operational element to create the desired functional element. The curved score(s), in cooperation with the structural organization and composition, produce a constructed utensil that meets or exceeds performance of conventional preformed disposable/single-use utensils. This provides a superior option over conventional constructed utensils because the user gains the advantage of an improved single-use application while the utensil is eco-friendly as it has a minimalist design that is effective and capable of being made compostable and/or recyclable with recyclable, sustainable, renewable resources. These constructible utensils may be particularly configured for specific applications, including tasting, stirring, spreading, consuming harder/firmer foodstuffs, "fork-like" utensil, and the like.

Manufacturers have an option of configuring the base material, the periphery boundary, the placement and orientation of scores, and any coating to customize the final design in a wide variety of ways. As further explained herein, the user-constructible utensils include tasters, spreaders, stirrers that can have appropriately shaped handles and operational elements (e.g., bowls for a tasting spoon) that have the desired capacity, shape, and mouth-feel. Some bowls may have a deep configuration for more capacity while others may be shallower and sturdier to serve dense/hard foodstuff (e.g., ice cream). The fundamental teachings herein are adaptable to a wide-variety of user-constructible utensils for a wide-variety of tasks. In some cases, the utensil doubles as a dispensing mechanism, in lieu of a cup, which is particularly important for applications that use a utensil along with a cup and/or plate/napkin, cracker, or the like, providing valuable cost-savings.

In some embodiments, such as a dispensing and tasting implement at a food show of the like, the base material and scores are arranged and configured so that a deformed handle (e.g., folded) maintains a sufficiently useful fold after being released from the folder to retain the desired configuration of the operational end. For example for a tasting spoon, several utensils may be configured including folding the handle to produce the bowl. The folded utensils are set on a work surface and a product is placed into each of the bowls. Consumers may simply pick up a utensil and sample the product without any other apparatus. This allows for one-handed sampling, as opposed to cup and spoon, which is ideal for consumers having their hands full with products, information, containers, kids, and the like. In many of the preferred embodiments, lateral edges of the planar apparatus are folded up to produce a handle and bowl, often leaving a planar medial portion of the handle and bowl that provide a stable platform for adding, dispensing, and presenting the product to the prospective consumers. Most tasting spoons could not be arrayed and used in this fashion as they are not large enough or stable enough and do not have the upward-extending handle portions to allow them to be easily grasped. In this way, packing density for dispensing and presenting is improved and retailers/users may select from a middle of the array with greatly reduced risk of touching or otherwise contaminating foodstuff in other utensils.

Particularly for those applications that include a disposable plate, cup, napkin for dispensing and a utensil to consume, the versatility of the implementations of the present invention in combining these functions further saves costs and reduces environmental impact in the pre-consumer and post-consumer costs of such scenarios.

As noted above, many existing single use solutions attempt to emulate conventional utensils. While this is desirable to simplify training and use of the utensils, the products are often wasteful of material (and in some cases extra unneeded material results in the material/product taking up excessive space which further adds to costs in transportation and storage and is "anti-green"), particularly for applications where the utensil may be used for a few seconds. Considering that some current utensils are used for just a few seconds and may exist in landfills for centuries points out one of the many problems addressed and mitigated by embodiments of the present invention.

The preferred implementations of the present invention provide a greatly reduced carbon footprint due to several factors including use of a new minimalist design (rather than scaling of previous utensils) that both uses less material and reduces unnecessary material and use of environmentally friendly materials. This is true even in cases where the material is misprocessed by the consumer after use. For example, if a compostable EcoTensil® brand utensil ends up in a landfill it will have an increased chance to be partially-to-substantially degraded by the time it gets to a landfill where under normal conditions it would not degrade. (Modern landfill designs attempt to minimize any degradation of all materials by removing oxygen and other requirements for biodegradation/composting). Because the product has minimal material use and quickly degrades, the product lends itself to interstitial location among the nooks and crannies of other more rigid elements of the landfill, which effectively removes its contribution to the landfill volume.

Reduction in material used in the designs helps to maximize an amount of pre-disposal degradation that occurs which is advantageous no matter whether the consumer selected the correct disposal option. The advantages of minimal construction are magnified when also considering the production, shipment, storage, use, and disposal volumes. The reduced eco-footprint appears all along the lifespan of the product and savings and advantages are compounded when considering the entire lifecycle.

In some cases, a locking mechanism may be preferred to maintain a measure lid in a constructed mode and resist unfolding.

Other embodiments are configured for installation between a freshness seal of a canister (overlying an opening) and an overcap to protect the seal and allow for reclosure.

A constructible utensil, such as for a taster for example, includes a deformable generally planar rigid paperboard sheet defining a body, the body including a handle element having a fold axis and a bowl element coupled to the handle element wherein the handle element is generally elongate and rectilinear and includes a length generally parallel to the fold axis that is at least two times greater than a width generally perpendicular to the fold axis; a first curved score disposed on the body and extending from a first point on the bowl element proximate a first edge of the bowl element to a second point on the handle element proximate the fold axis; and a second curved score disposed on the body and extending from a third point on the bowl element proximate a second edge of the bowl element towards the second point; wherein the scores are generally concave with respect to the fold axis; and wherein the body is configured with an arrangement of the scores such that a folding of the body about the fold axis introduces a bowl in the bowl element by distortion of the bowl element along the curved scores.

A constructible utensil, such as for a stirrer for example, includes a deformable generally planar rigid sheet material defining a body, the body including a handle element having a fold axis and a bowl element coupled to the handle element at a transition area wherein the handle element is generally elongate and includes a length generally parallel to the fold axis that is at least ten times greater than a first width generally perpendicular to the fold axis; a first score disposed on the body and extending from a first point on the bowl element to a second point on the handle element proximate the fold axis and crossing the transition area; and a second score disposed on the body and extending from a third point towards the second point, wherein the third point is disposed on the bowl element; wherein the scores are curved and generally concave with respect to the fold axis and generally symmetrical about the fold axis; wherein the body is configured with arrangement of the scores such that a folding of the body about the fold axis introduces a bowl in the bowl element.

A constructible utensil, such as for a spreader for example, includes a deformable generally planar rigid paperboard sheet defining a body, the body including a handle element having a fold path and a spreader element coupled to the handle element wherein the spreader element is generally asymmetrically elongate and includes a first lateral edge generally straight and parallel to the fold path and a second lateral edge generally convexly curved with respect to the fold path and converging to the first lateral edge; a first score disposed on the body and extending from a first point on the spreader element to a second point on the handle element proximate the fold path; and a second score disposed on the body and extending from a third point towards the second point; wherein the body is configured with arrangement of the scores such that a folding of the body about the fold path introduces a bowl in the spreader element.

A constructible utensil includes a deformable generally planar rigid paperboard sheet defining a generally elongate and rectilinear body having a long axis extending from a proximal end to a distal end and a short axis generally perpendicular to the long axis with the body including a fold axis extending along the long axis and the body including a length generally parallel to the fold axis that is at least two times greater than a width generally parallel to the short axis; a first curved score disposed on the body and convex with respect to the fold axis, the first curved score extending from a first point on the body near a first lateral edge of the body at the distal end of the body to a second point on the body proximate the fold axis, wherein the first point is greater than 75% of the length from the proximal end and wherein the second point within 33% of the length from the proximal end; and a second curved score, symmetric about the fold axis to the first curved score and disposed on the body, the second curved score extending from a third point on the body near a second lateral edge of the body at the distal end to the second point; wherein the body is configured with arrangement of the scores such that a folding of the body about the fold axis introduces a bowl in the body at the distal end by distortion in the body along the scores.

A method of manufacturing a constructible utensil includes a) forming a generally elongate and rectilinear body from a deformable generally planar rigid paperboard sheet, the body having a long axis extending from a proximal end to a distal end and a short axis generally perpendicular to the long axis with the body including a fold axis extending along the long axis and the body including a length generally parallel to the fold axis that is at least two times greater than a width generally parallel to the short axis; b) disposing a first curved score on the body, the first curved score convex with respect to the fold axis, the first curved score extending from a first point on the body near a first lateral edge of the body at the distal end of the body to a second point on the body proximate the fold axis, wherein the first point is greater than 75% of the length from the proximal end and wherein the second point within 33% of the length from the proximal end; and c) disposing a second curved score, symmetric about the fold axis to the first curved score, on the body, the second curved score extending from a third point on the body near a second lateral edge of the body at the distal end to the second point; wherein the body is configured with arrangement of the scores such that a folding of the body about the fold axis introduces a bowl in the body at the distal end by distortion in the body along the scores.

A method of constructing a utensil includes a) folding a generally elongate and rectilinear body about a fold axis, the body constructed from a deformable generally planar rigid paperboard sheet, the body having a long axis extending from a proximal end to a distal end and a short axis generally perpendicular to the long axis with the body including the fold axis extending along the long axis and the body including a length generally parallel to the fold axis that is at least two times greater than a width generally parallel to the short axis and the body including a pair of curved scores symmetrically disposed on the body, the pair of curved scores convex with respect to the fold axis, the curved scores extending from a pair of points on the body near opposing lateral edges of the body at the distal end of the body and each converging to a convergence point on the body proximate the fold axis, wherein the pair of points are greater than 75% of the length from the proximal end and wherein the convergence point is within 33% of the length from the proximal end; and b) inducing a bowl in the distal end responsive to the folding step a) by distorting the body along the pair of scores as the body is folded.

A system for serving a foodstuff includes a worksurface; and a plurality of user-constructible utensils constructed into a plurality of shape-retaining utensils with each the shape-retaining utensil including a bowl-element supporting a portion of the foodstuff and having a pair of lateral edges folded upwards and retained folded without adhesive due to a configuration of construction materials used in a manufacture of the plurality of user-constructible utensils and wherein the plurality of constructed utensils are arrayed on the worksurface with the upward pair of lateral edges useable as a handle to remove a corresponding utensil and foodstuff from the worksurface.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a pre-constructed constructible scoop;

FIG. 2 illustrates a constructed format for the scoop of FIG. 1;

FIG. 3 illustrates a first alternative pre-constructed constructible scoop;

FIG. 4 illustrates a constructed format for the scoop of FIG. 3;

FIG. 5 illustrates a second alternative pre-constructed constructible scoop; and FIG. 6 illustrates a constructed format for the scoop of FIG. 5;

FIG. 7 illustrates a representative constructible utensil for high-speed manufacture;

FIG. 8 illustrates a simple die-cut system that may be produced by a rotary printing process;

FIG. 9 illustrates a set of constructible utensils made by a rotary printing process;

FIG. 10 illustrates the close-up section identified in FIG. 9;

FIG. 11 illustrates a matrix system for high-speed rotary printing;

FIG. 12 illustrates a first alternate matrix system for high-speed rotary printing;

FIG. 13 illustrates a second alternate matrix system for high-speed rotary printing;

FIG. 14 illustrates a third alternate matrix system for high-speed rotary printing;

FIG. 15 illustrates a fourth alternate matrix system for high-speed rotary printing;

FIG. 16 illustrates a fifth alternate matrix system for high-speed rotary printing;

FIG. 17 illustrates a sixth alternate matrix system for high-speed rotary printing;

FIG. 18 illustrates a constructible utensil defined by the matrix system of FIG. 16 and FIG. 17; and FIG. 19 illustrates an alternate constructible utensil that may be defined by the disclosed matrix systems;

FIG. 20 illustrates a constructible utensil delivery system including a container with an overwrap as delivered to a prospective consumer;

FIG. 21 illustrates the constructible utensil delivery system of FIG. 20 with the overwrap partially pulled back to reveal the integrated constructible utensil;

FIG. 22 illustrates a first alternate constructible utensil delivery system including a container with an overwrap as delivered to a prospective consumer;

FIG. 23 illustrates the first alternate constructible utensil delivery system of FIG. 22 with the overwrap partially pulled back to reveal the integrated constructible utensil;

FIG. 24 illustrates a second alternate constructible utensil delivery system including a container with an overwrap as delivered to a prospective consumer;

FIG. 25 illustrates the second alternate constructible utensil delivery system of FIG. 24 with the overwrap partially pulled back to reveal the integrated constructible utensil; and FIG. 26 illustrates a representative unconstructed constructible utensil that may be used in the embodiments of FIG. 20-FIG. 25;

FIG. 27-FIG. 31 illustrate features and structures for improvements in constructible utensils and the like;

FIG. 27 illustrates a constructible utensil including an exterior perimeter and a score pattern configured to produce a constructible spork;

FIG. 28 illustrates a constructible taster utensil including an exterior perimeter and a score pattern configured to produce a constructible taster having a widened operative element;

FIG. 29 illustrates both an unconstructed and constructed constructible utensil including an exterior perimeter and a score pattern configured to produce a constructible utensil having a backstop;

FIG. 30 illustrates a constructible taster utensil including a perpendicular score for length-shortening folding;

FIG. 31 illustrates a construction sequence for a constructible utensil including an exterior perimeter and a score pattern configured to produce a novel spoon lid utensil;

DETAILED DESCRIPTION OF THE INVENTION

The embodiments described herein preferably use an environmentally-friendly planar stock (and most preferably being compostable planar stock) having a thickness appropriate to the application. Appropriateness is measured by the material of the stock (e.g., a paperboard stock, a mineral composite, or the like) that may be folded and scored. It cannot be too thin or too thick. If it is too thin it cannot function effectively as a scoop and if it is too thick it is difficult to fold/bend without degradation/damage/fracture. Foldable paperboard stock (e.g., folding boxboard, 16 point cold cup stock, and the like) greater than 10 point, single or multi-ply, or its equivalent, is preferably used in the disclosed embodiments though other stock may be used.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Constructible Scoop/Measuring Device

Embodiments of the present invention provide a system and method for a constructible scoop that overcomes the disadvantages of conventional preformed scoops that are shipped in association with a scoopable product. The following description is presented to enable one of ordinary skill in the art to make and use the invention and is provided in the context of a patent application and its requirements.

Figure 1:
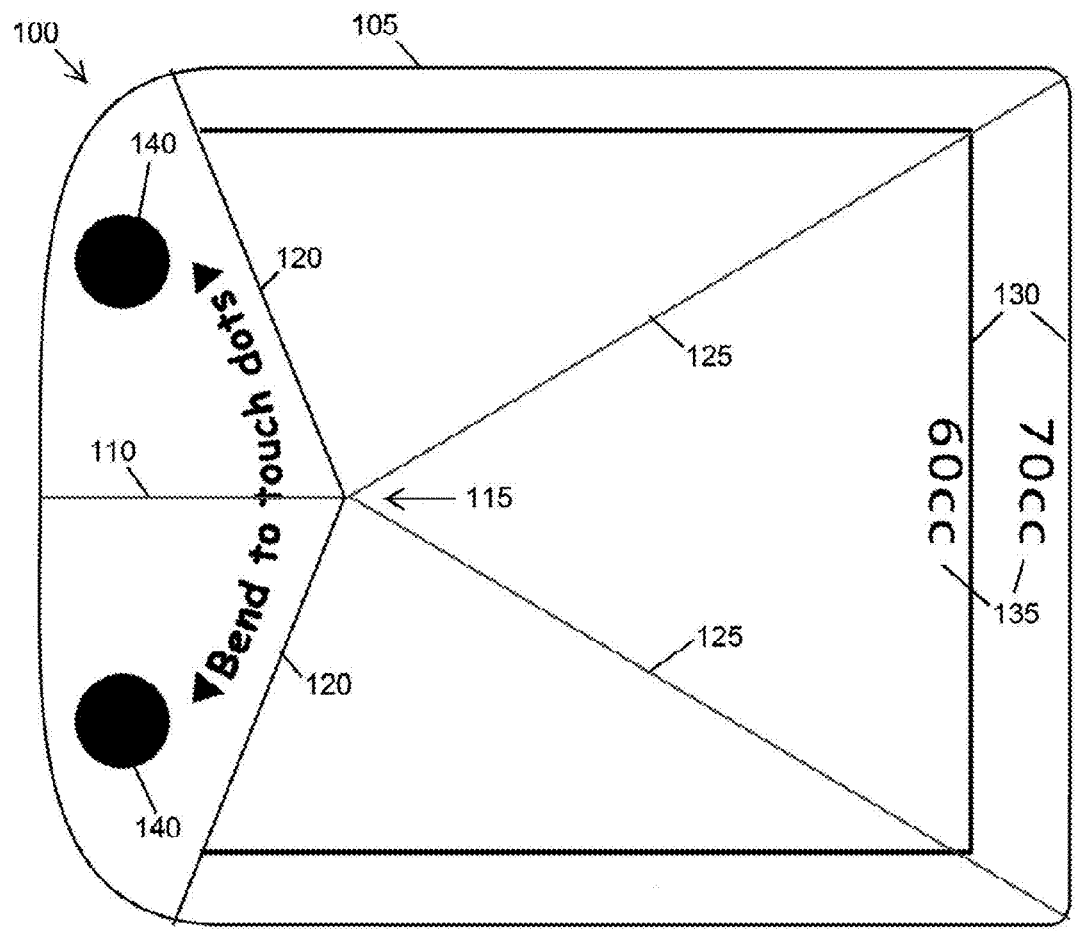
FIG. 1-FIG. 6 illustrate a constructible scoop.
Figure 2:
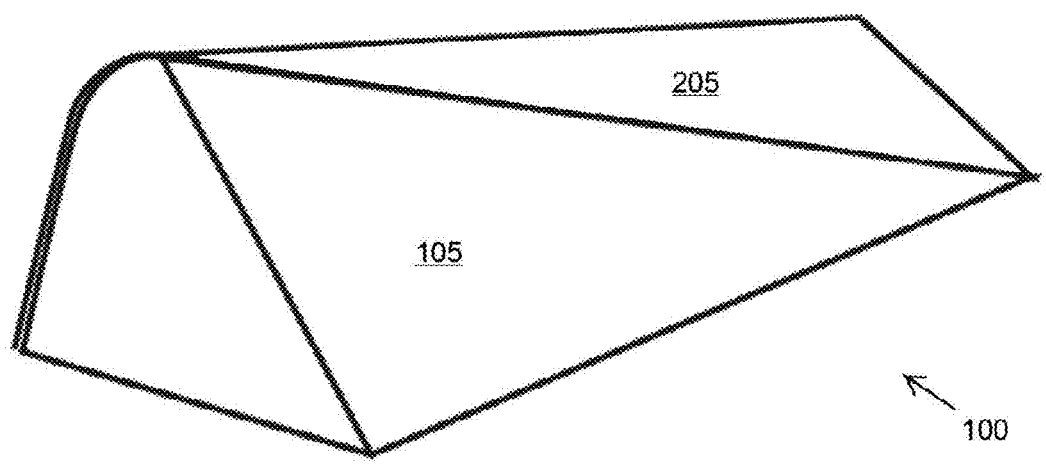

FIG. 1 illustrates a pre-constructed constructible scoop 100 and FIG. 2 illustrates a constructed format for constructible scoop 100. Constructible scoop 100 includes a body 105 that is planar and deformable (e.g., bendable, foldable, and/or otherwise transformable) made from a suitable planar stock. Body 105 includes a handle portion joined to a scoop portion, and a plurality of scores defining these body portions and aiding in formation of a handle from the handle portion and a scoop at the scoop portion when constructed. Body 105 is generally rectilinear having a length greater than a width. Corners are rounded to avoid sharp corners with corners for the handle portion having a greater radius of curvature to better facilitate easy gripping without encountering an uncomfortable protruding edge.

The plurality of scores include a longitudinal score 110 extending from a rear lateral edge of the handle portion to a vertex 115. Longitudinal score 110 extends lengthwise along a longitudinal axis that divides body 105 into two generally symmetric halves.

The plurality of scores also include a pair of handle scores 120 and a pair of scoop scores 125 that each extend from vertex 115 to an edge of body 105. Handle scores 120 form an angle less than ninety degrees with respect to longitudinal score 110 and extend back towards the rounded corners of the handle portion while scoop scores 125 form an angle greater than ninety degrees with respect to longitudinal score 110 and extend forward towards the rounded corners of the scoop portion. The particular angular relationships formed by these scores are related to the length and width of body 105 as well as the placement of vertex 115 along the longitudinal axis. The length and width and placement of vertex 115 affect the defined volume of the constructed scoop made from constructible scoop 100. Note that the indicated score pattern is not necessarily reflective of which side of body 105 supports any given score. For example, different implementations may provide for any particular score to fold upwardly or downwardly (as seen from a top view such as FIG. 1). And in some cases, irrespective of which "direction" any particular score folds, bends, or transforms, a score, deboss, pattern, or the like may be on either side of body 105. (That is, it is not necessary that a "top" score requires that body 105 must fold either particular direction, but any given implementation typically has a preference for fold directions of the score patterns as implemented in order to produce a desired configuration for the constructed utensil or implement or device.

In addition to the plurality of scores, body 105 is preferably provided with one or more optional volume indicators 130 and/or corresponding volumetric labels 135 for a closed volume 205 (closed in this context means closed at the bottom and sides with a top opening). Volume indicators 130 provide a user with a visual calibration (which may be approximate) of a volume of material disposed in the scoop of a constructed scoop as shown in FIG. 2 when the material fills the scoop portion to any particular indicator 130. As noted, a top lateral edge of the scoop portion may be one such indicator 130.

The handle portion also includes a pair of construction indicia 140 (e.g., the pair of "bend to touch dots"). These indicia visually guide the user on how to manipulate body 105 to construct the scoop. The indicated action, in cooperation with the arrangement of the plurality of scores, initiates the constructing action to produce the final result. Note that "bend to touch" may in some instances be an indication to touch a "backside" of the dots together, such as when longitudinal score 110 lifts relative to the lateral edges so the lateral edges move below longitudinal score 110. Formation of the score pattern and particularly longitudinal score 110 to have a predisposition to folding in an appropriate and particular direction aids in any disambiguation as to which side of the dots are to be touched.

In operation, body 105 is manipulated by bending, folding, and the like about the score pattern in order to touch the backsides of construction indicia 140. This action propagates bending, folding, and transformation forces along the score pattern so that vertex 115 "sinks" relative to the lateral edges to form closed volume 205. The scoop is completely constructed when the dots are touched, however a partially constructed scoop may be useful in some contexts. The user grips the handle (formed from the handle portion) and operates the scoop to capture a desired quantity of material within closed volume 205.

In some embodiments, a tacky adhesive or other connection mechanism may be disposed on the backsides of the dots to maintain the scoop in the constructed mode. The connection mechanism may be temporary allowing for deconstruction and flattening or permanent to maintain the scoop in the constructed mode between uses and after the user releases the handle portion.

Figure 3:
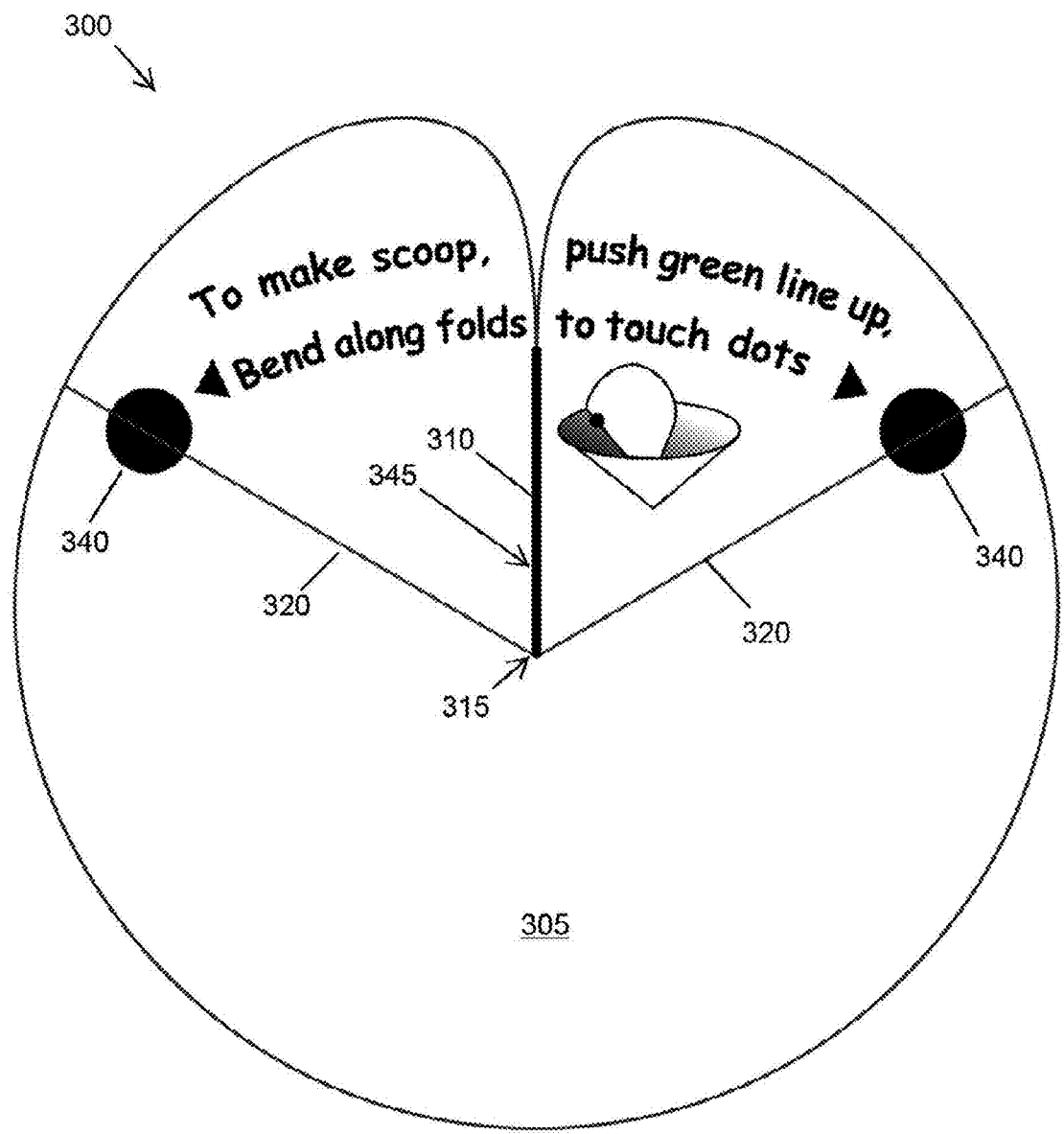
Figure 4:
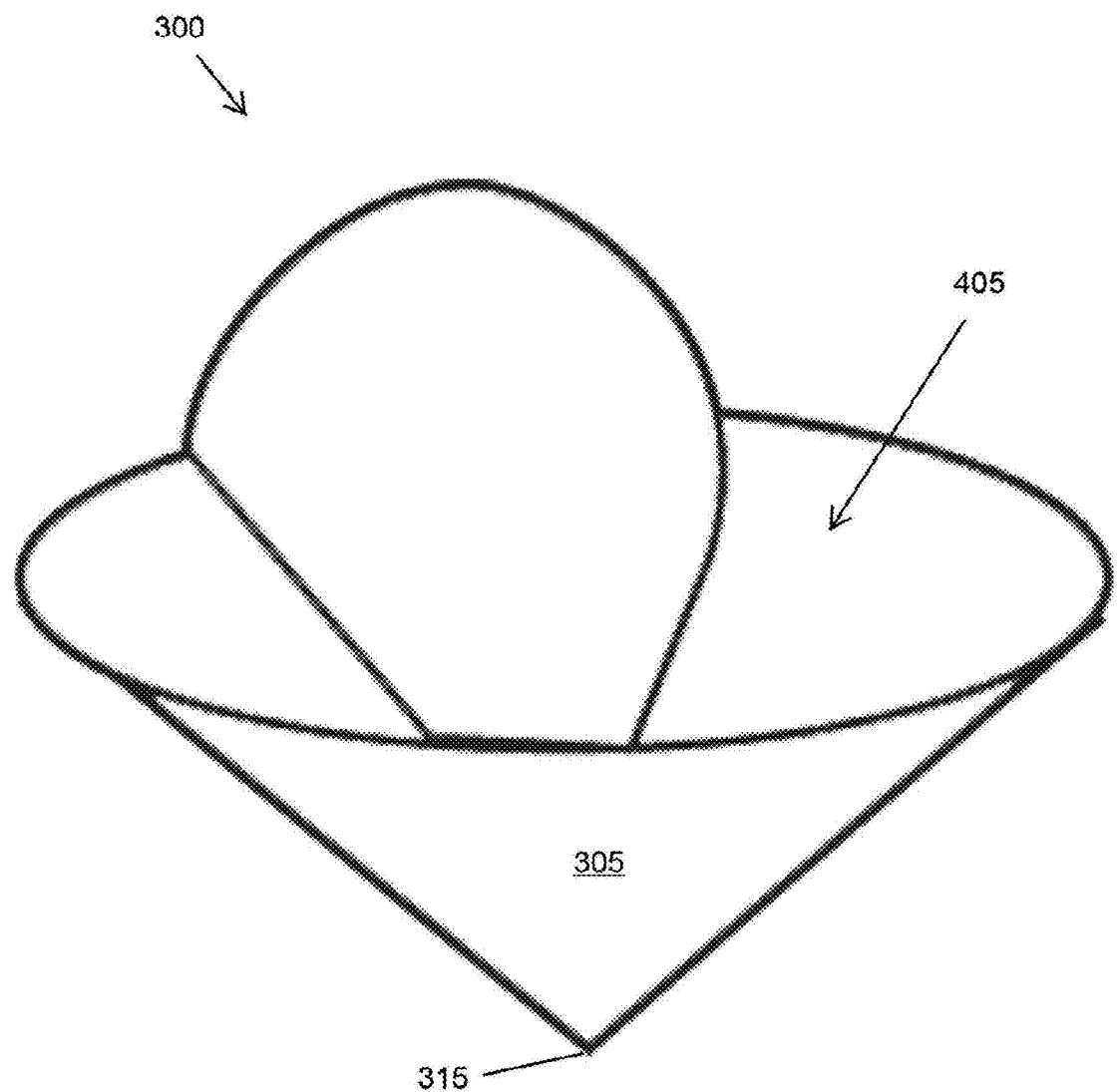

FIG. 3 illustrates a first alternative pre-constructed constructible scoop 300, and FIG. 4 illustrates a constructed format for the scoop of FIG. 3. Constructible scoop 300 includes a body 305 that is planar and deformable (e.g., bendable, foldable, and/or otherwise transformable) made from a suitable planar stock. Body 305 includes a handle portion joined to a scoop portion, and a plurality of scores defining the portions and aiding in formation of a handle from the handle portion and a scoop at the scoop portion when constructed. Body 305 is generally circular though some embodiments may be elliptical or ovoid or the like.

The plurality of scores include a diametrical score 310 extending from a rear edge of the handle portion to a vertex 315. Diametrical score 310 extends along a diameter that divides body 305 into two generally symmetric halves. For other shapes score 310 will not be a diameter but some other line with symmetry (e.g., a major or minor axis of an elliptical format).

The plurality of scores also include a pair of handle scores 320 that each extend from vertex 315 to an edge of body 305. Handle scores 320 form an angle less than ninety degrees with respect to diametrical score 310. The particular angle formed by these scores is related to the radius and/or length and width of body 305 as well as the placement of vertex 315 along the longitudinal axis. The length and width and placement of vertex 315 affect the defined volume of the constructed scoop made from constructible scoop 300. Note that the indicated score pattern is not necessarily reflective of which side of body 305 supports any given score. For example, different implementations may provide for any particular score to fold upwardly or downwardly (as seen from a top view such as FIG. 3). And in some cases, irrespective of which "direction" any particular score folds, bends, or transforms, a score, deboss, pattern, or the like may be on either side of body 305. (That is, it is not necessary that a "top" score requires that body 305 must fold either particular direction, but any given implementation typically has a preference for fold directions of the score patterns as implemented in order to produce a desired configuration for the constructed utensil or implement or device.

In addition to the plurality of scores, body 305 is preferably provided with one or more optional volume indicators and/or corresponding volumetric labels for a closed volume 405 (closed in this context means closed at the bottom and sides with a top opening). Volume indicators provide a user with a visual calibration (which may be approximate) of a volume of material disposed in the scoop of a constructed scoop as shown in FIG. 4 when the material fills the scoop portion to any particular indicator. A top lateral edge of the scoop portion may be one such indicator.

The handle portion also includes a pair of construction indicia 340 (e.g., the pair of "bend to touch dots") and a colored score identifier 345. These indicia visually guide the user on how to manipulate body 305 to construct the scoop. The indicated action, in cooperation with the arrangement of the plurality of scores, initiates the constructing action to produce the final result. Note that "bend to touch" may in some instances be an indication to touch a "backside" of the dots together, such as when score 310 lifts relative to the lateral edges so the lateral edges move below score 310. Formation of the score pattern and particularly longitudinal score 310 to have a predisposition to folding in an appropriate and particular direction aids in any disambiguation as to which side of the dots are to be touched. In some cases, additional instructions may be useful and/or necessary to indicate to a user how to manipulate body 305. For example, the instruction text refers to a "green line" which references colored (i.e., "green"—though any distinguishing color or pattern may be used) score identifier 345. In this case, score 310, identified by colored score identifier 345, is pushed "up" to bring back sides of construction indicia 340 into contact.

In operation, body 305 is manipulated by bending, folding, and the like about the score pattern in order to touch the backsides of construction indicia 340. This action propagates bending, folding, and transformation forces along the score pattern so that vertex 315 "sinks" relative to the lateral edges to form closed volume 405. The scoop is completely constructed when the dots are touched, however a partially constructed scoop may be useful in some contexts. The user grips the handle (formed from the handle portion) and operates the scoop to capture a desired quantity of material within closed volume 405.

In some embodiments, a tacky adhesive or other connection mechanism may be disposed on the backsides of the dots to maintain the scoop in the constructed mode. The connection mechanism may be temporary allowing for deconstruction and flattening or permanent to maintain the scoop in the constructed mode between uses and after the user releases the handle portion.

Figure 5:
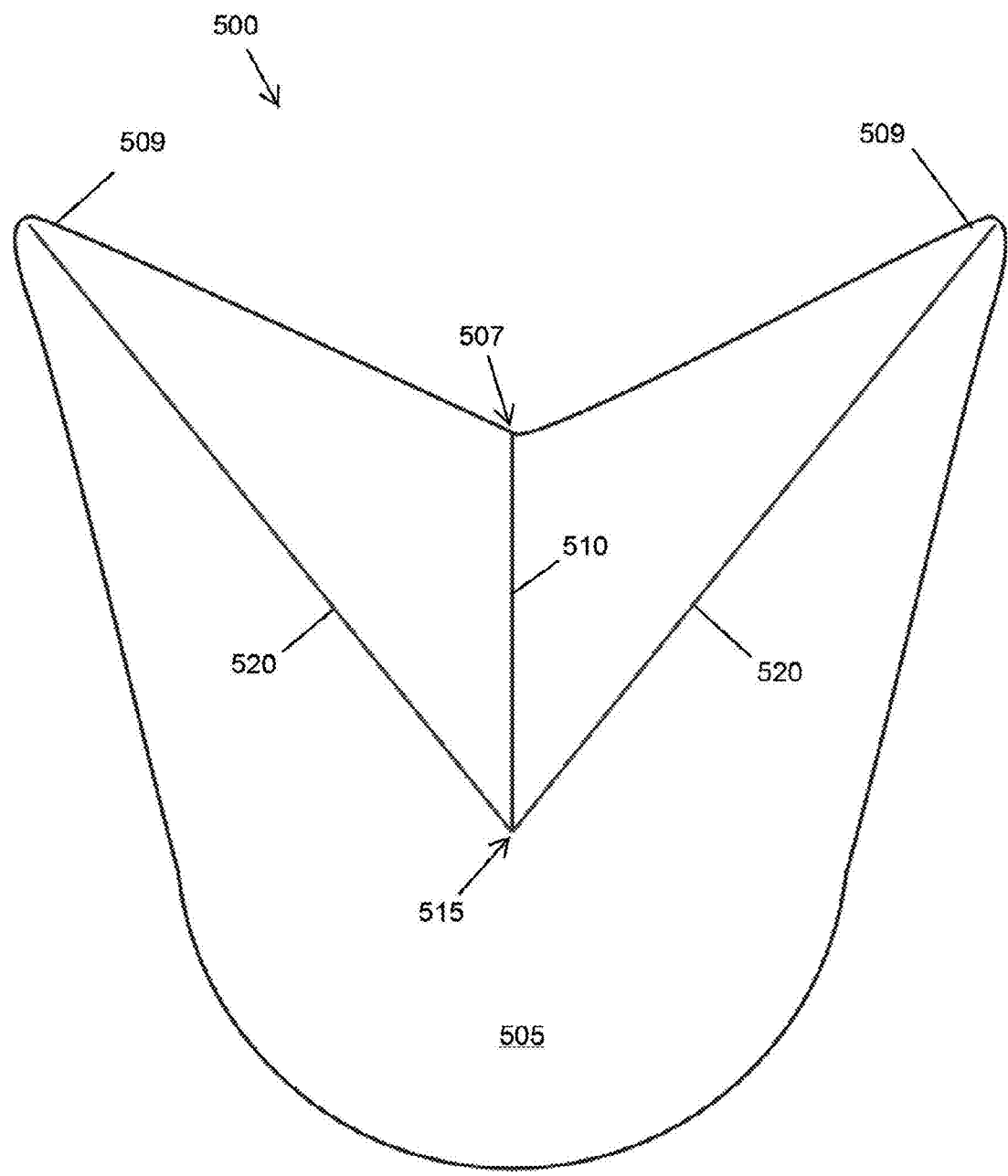
Figure 6:
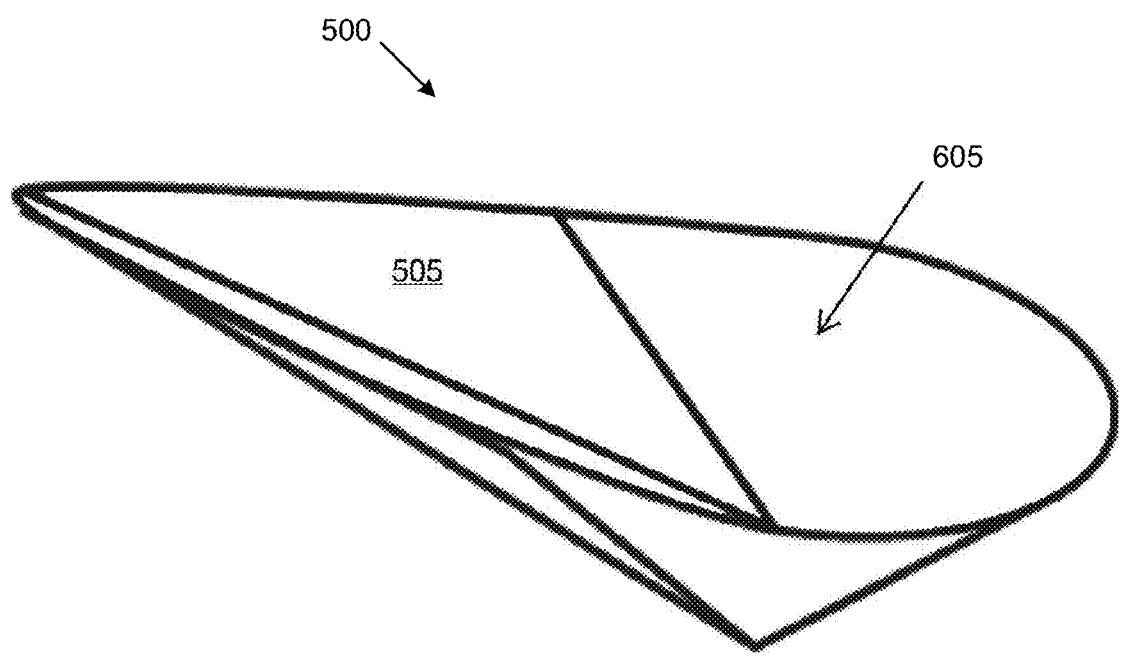

FIG. 5 illustrates a second alternative pre-constructed constructible scoop 500 and FIG. 6 illustrates a constructed format for constructible scoop 500 of FIG. 5. Constructible scoop 500 includes a body 505 that is planar and deformable (e.g., bendable, foldable, and/or otherwise transformable) made from a suitable planar stock. Body 505 includes a handle portion joined to a scoop portion, and a plurality of scores defining the portions and aiding in formation of a handle from the handle portion and a scoop at the scoop portion when constructed. Body 505 includes a complex perimeter shaped including a rounded (some cases circular) proximal end joined to a middle portion including diverging lateral edges extending to a distal end. A rear edge is "notched" with a notch point 507 at a longitudinal axis of body 505, notch point 507 creating a pair of diverging pointed handle elements 509.

The plurality of scores include a longitudinal score 510 extending from notch point 507 of the handle portion to a vertex 515. Longitudinal score 510 extends along the longitudinal axis that divides body 505 into two generally symmetric halves.

The plurality of scores also include a pair of handle scores 520 that each extend from vertex 515 to a tip of handle element 509. Handle scores 520 form an angle less than ninety degrees with respect to longitudinal score 510. The particular angle formed by these scores is related to the length and width of body 505 as well as the placement of vertex 515 along the longitudinal axis. The length and width and placement of vertex 515 affect the defined volume of the constructed scoop made from constructible scoop 500. Note that the indicated score pattern is not necessarily reflective of which side of body 505 supports any given score. For example, different implementations may provide for any particular score to fold upwardly or downwardly (as seen from a top view such as FIG. 5). And in some cases, irrespective of which "direction" any particular score folds, bends, or transforms, a score, deboss, pattern, or the like may be on either side of body 505. (That is, it is not necessary that a "top" score requires that body 505 must fold either particular direction, but any given implementation typically has a preference for fold directions of the score patterns as implemented in order to produce a desired configuration for the constructed utensil or implement or device.

In addition to the plurality of scores, body 505 may be preferably provided with one or more optional volume indicators and/or corresponding volumetric labels for a closed volume 605 (closed in this context means closed at the bottom and sides with a top opening). Volume indicators provide a user with a visual calibration (which may be approximate) of a volume of material disposed in the scoop of a constructed scoop as shown in FIG. 6 when the material fills the scoop portion to any particular indicator. A top lateral edge of the scoop portion may be one such indicator.

The handle portion may also include a pair of construction indicia (e.g., the pair of "bend to touch dots" as elsewhere described) and/or a colored score identifier. These indicia and identifiers visually guide the user on how to manipulate body 505 to construct the scoop. The indicated action, in cooperation with the arrangement of the plurality of scores, initiates the constructing action to produce the final result. Note that "bend to touch" may in some instances be an indication to touch a "backside" of the dots together, such as when longitudinal score 510 lifts relative to the lateral edges so the lateral edges move below longitudinal score 510. Formation of the score pattern and particularly longitudinal score 510 to have a predisposition to folding in an appropriate and particular direction aids in any disambiguation as to which side of the dots are to be touched. In some cases, additional instructions may be useful and/or necessary to indicate to a user how to manipulate body 505. For example, the instruction text may refers to a "green line" which references a colored (i.e., "green"—though any distinguishing color or pattern may be used) score identifier. For example, longitudinal score 510 could be identified by the colored score indicator, is pushed "down" to bring front sides of any construction indicia into contact.

In operation, body 505 is manipulated by bending, folding, and the like about the score pattern in order to touch the front sides of any construction indicia. This action propagates bending, folding, and transformation forces along the score pattern so that vertex 515 "sinks" relative to the lateral edges to form closed volume 605. The scoop is completely constructed when the dots are touched, however a partially constructed scoop may be useful in some contexts. The user grips the handle (formed from the handle portion) and operates the scoop to capture a desired quantity of material within closed volume 605.

In some embodiments, a tacky adhesive or other connection mechanism may be disposed on the backsides of the dots to maintain the scoop in the constructed mode. The connection mechanism may be temporary allowing for deconstruction and flattening or permanent to maintain the scoop in the constructed mode between uses and after the user releases the handle portion.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

High-Speed Manufacturing

Embodiments of the present invention provide a system and method for high-speed manufacturing of market-acceptable constructible utensils. The following description is presented to enable one of ordinary skill in the art to make and use the invention and is provided in the context of a patent application and its requirements.

FIG. 7-FIG. 19 illustrate features and structures associated with high-speed manufacture of constructible devices, such as those, for example, disclosed herein.

Figure 7:
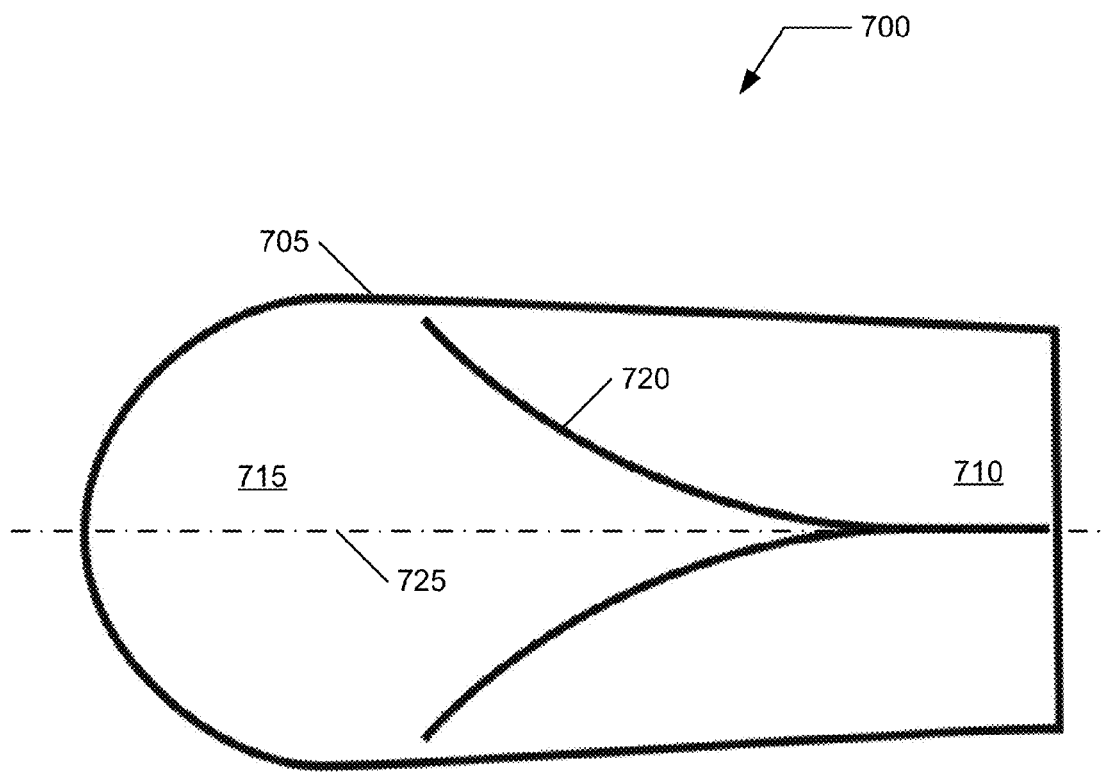
FIG. 7-FIG. 19 illustrate features and structures associated with high-speed manufacture of constructible devices.

FIG. 7 illustrates a representative constructible utensil 700 for high-speed manufacture. Utensil 700 is generally representative of a wide range of constructible utensils, some of which have been illustrated and described in related patents and patent applications. These related patents and patent applications include U.S. Pat. Nos. 8,210,381, D646,529, and D651,480, and U.S. patent application Ser. Nos. 13/357,557, 61/699,808, 61/699,787, 61/712,610, 13/797,446, all of which are hereby expressly incorporated by reference thereto in their entireties for all purposes.

Utensil 700 includes deformable sheet 705 that defines a handle 710 and an operational element 715 in which one or more scores 720, which may be either straight and curved (most preferably curved as shown, are cooperatively provided on sheet 705. The one or more scores 720 enable deformation of handle 710 and/or operational element(s) 715 to convert utensil 700 into a strong, sturdy, and functional implement sufficient to meet the required application. Utensil 700 includes a generally "bullet" shaped perimeter having a longitudinal folding axis 725 about which utensil 700 is generally symmetric. The perimeter is formed from a shape that is about 1.25 inches wide and about 3.125 inches long (the "bullet" shaped perimeter including a generally rectangular body that is about 1.25 inches×about 2.5625 inches and a semi-disk at one end of the rectangle having a radius of about 0.5625 inches). Preferably the stock material of the preferred embodiments have a thickness ranging between about 14-18 point caliper, though other thicknesses may be appropriate, depending upon design considerations. Scores and any desired indicia may be added before, during, or after formation. Preferably any ink for the indicia are non-toxic vegetable-based dyes. Some of the embodiments benefit from a coating to improve mouth-feel and/or provide a moisture-barrier to extend use for constructible utensils, such as those expected to be used for minutes instead of seconds. As noted, other sizes, configurations, and arrangements for utensil 700 are within the scope of the present invention.

In one embodiment, the unconstructed utensil is provided on a planar sheet made of the requisite material (i.e., an appropriately green/sustainable material) that may be processed to enhance function (e.g., coated with environmentally appropriate material) to resist premature degradation during use (e.g., a moisture-barrier) or it may be manufactured of a moisture-barrier material (e.g., calcium carbonate), collectively a coating, or inherent characteristic or other moisture protection system is referred to as moisture-barrier property. Thus, quantities of the unconstructed material achieve a far greater packing density as compared to pre-constructed utensils, which saves money on shipping and storage because of the smaller cube size. For many applications, handle 710 and operational elements 715 are minimalist in material cost while maximizing structural strength and user-experience consistent with the intended use all the while having a smaller carbon footprint.

Handle 710, typically with one or more curved scores 720 that define a folding axis 725, is operated by bringing lateral portions closer together out of the plane (e.g., folding or otherwise deforming) handle 710 along one or more curved scores 720. This folding induces a responsive distortion/ deformation of operational element 715 to create the desired functional element (e.g., a "bowl" or three-dimensional volume defining profile. Curved score(s) 720, in cooperation with the structural organization and composition, produce a constructed utensil that meets or exceeds performance of conventional preformed disposable/single-use utensils. This provides a superior option over conventional constructed utensils because the user gains the advantage of an improved single-use application while the utensil is eco-friendly as it has a minimalist design that is effective and capable of being made compostable and/or recyclable with recyclable, sustainable, renewable resources. These constructible utensils may be particularly configured for specific applications, including tasting, stirring, spreading, consuming harder/ firmer foodstuffs, "fork-like" utensil, and the like.

Manufacturers have an option of configuring the base material, the periphery boundary, the placement and orientation of scores, and any coating to customize the final design in a wide variety of ways. As further explained herein, the user-constructible utensils include tasters, spreaders, stirrers that can have appropriately shaped handles and operational elements (e.g., bowls for a tasting spoon) that have the desired capacity, shape, and mouth-feel. Some bowls may have a deep configuration for more capacity while others may be shallower and sturdier to serve dense/hard foodstuff (e.g., ice cream). The fundamental teachings herein are adaptable to a wide-variety of user-constructible utensils for a wide-variety of tasks. In some cases, the utensil doubles as a dispensing mechanism, in lieu of a cup, which is particularly important for applications that use a utensil along with a cup and/or plate/napkin, cracker, or the like, providing valuable cost-savings.

Figure 8:
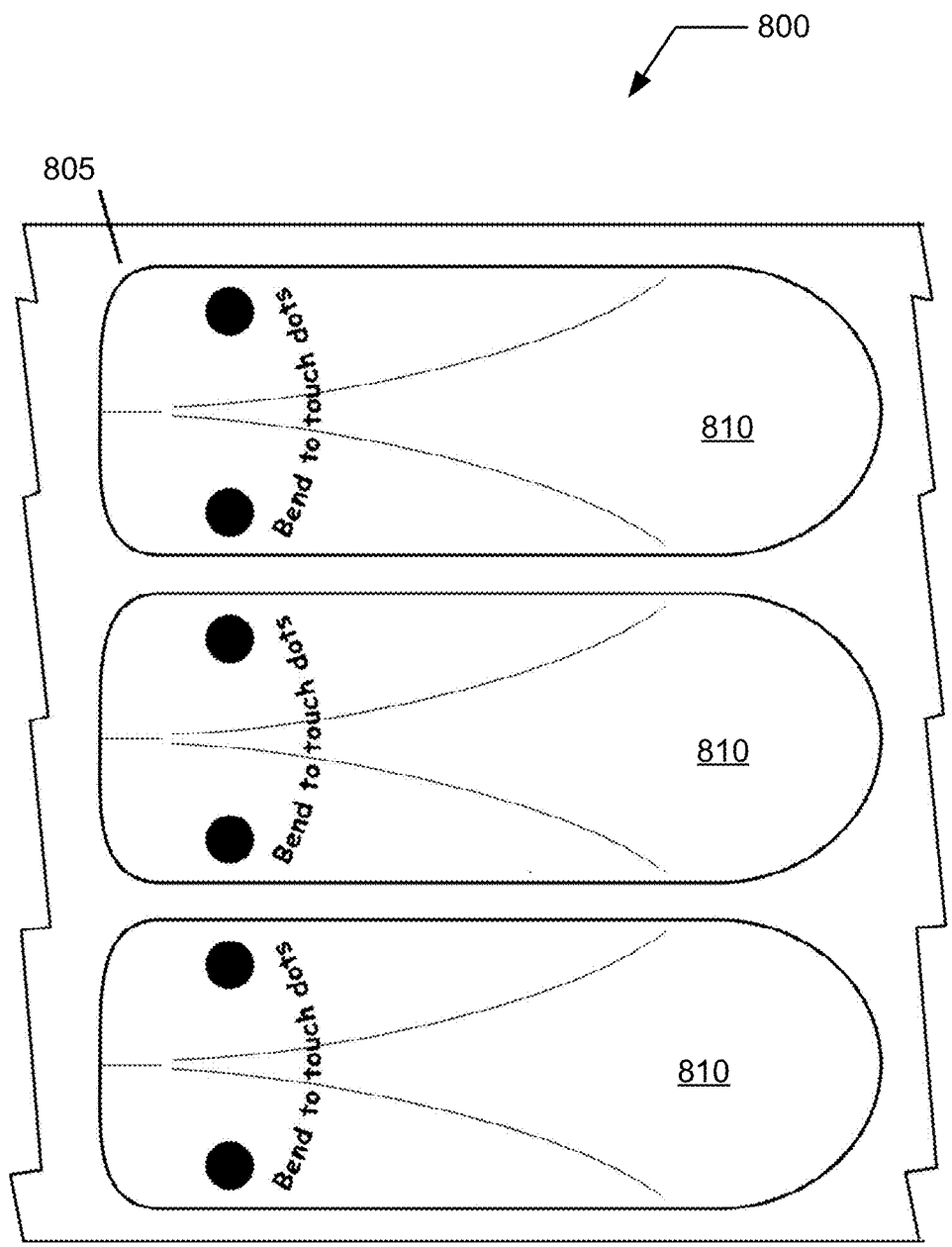

FIG. 8 illustrates a die-cut system 800 that may be produced by a rotary printing process. Die-cut system 800 produces a matrix 805 defining a set of constructible utensils 810 each cycle. In a rotary die-cutting process, a roll of appropriate foundation material (e.g., paperstock) of the appropriate width and thickness is fed into a rotary press as a web. That rotary press uses a rotary die to print, score, and cut the web as desired. The rotary die includes a number of steel rules that define each utensil 810 by embossing the scores and cutting the requisite perimeter(s).

For ease of illustration and to simplify the discussion, matrix 805 is illustrated as defining 3 rows (in one column) of utensils 810. In actual practice, a number N of rows is defined in matrix 805 each cycle. In this system, matrix 805 has a minimum width of the collective width of the N number of utensils plus the collective margin surrounding the utensils. This matrix width defines a width of the web.

In system 800, each utensil 810 is completely independent of matrix 805 after the cutting process. An output of the rotary process from system 800 may include an unbroken matrix 805 having holes where each utensil 810 was formed along with N number of rows of individual utensils 810, N in actual use is 6 or more. The rotary press may produce the N rows of individual utensils 810 so quickly that utensils 810 of the same row overlap a previous utensil just as they are overlapped by the next subsequent utensil. As the speed increases the overlap may be almost complete where an overlying one is almost perfectly aligned with its corresponding bottom one.

Ideally, the rotary press would continue to quickly produce the N separate rows of discrete utensils that would be conveniently and efficiently collected, stacked, and packaged as desired. Unfortunately, system 800 is not ideal. To minimize wasted material in matrix 805 and achieve one of the goals of cost reduction, the rows need to be very close to each other. The closeness of the rows means that invariably the N separate rows begin to merge as individual ones of utensils 810 in a row begin to fishtail and come out of alignment. The effect is magnified in that it is common to use a moisture-barrier or coating to improve mouth feel, protect against premature degradation, and the like and that coating can make utensils 810 slippery which promotes the fishtailing and chaotic stacking. When enough utensils 810 have fishtailed or the N rows have otherwise lost their orderly character promised in the ideal situation and become one large pile on a conveyor belt, the process breaks down as the mass of individual utensils 810 becomes unmanageable.

To counter the fishtailing, one solution includes running the rotary press at a slow speed which is unacceptable as the cost-reduction of system 800 is at least premised on high-speed operation. Another solution is to attempt to insert physical dividers between each row. In order to add these dividers, the spacing between each row must be increased which adds to the costs. If it were the case that the dividers were effective, some systems may contemplate their use as it could produce an acceptable result. But to keep the individual utensils in each row from catching and hanging on the dividers (the dividers do not prevent the fishtailing but seek to prevent the fishtailing separated individual utensils from chaotically merging into an adjoining row), the row spacing needs to be further increased beyond what is required to insert the rows thus the divider solution will not work, especially as printing speeds increase which tends to cause even more fishtailing and more misalignment leading to unorganized piles of individual utensils that cannot be cost-effectively machine-packaged. Labor-intensive and relatively costly hand operation can bring order at what is generally believed to be too great of cost.

Another characteristic of the rotary die that influences the printing of constructible utensil 810 is detailed later. An introduction to this characteristic is that the rotary die can influence the pattern of the scores. When comparing the score pattern of utensil 700 against the score pattern of utensil 810, the merging/converging score pattern of utensil 700 is replaced with distinct individual score elements. One reason for this is that the steel rules of the rotary die do not often lend themselves to creating and forming a converging, merging, and continuing score pattern as shown in FIG. 7. When it is possible to do so (create a high-speed pseudo merged converging continuing score), the score pattern is often not symmetric which can adversely affect the folding and constructing of the constructible utensil as it becomes asymmetric when folded. Further, one of the problems with a rotary die that is used to create the score pattern of FIG. 7 is that the die is subjected to greater wear and tear and has a significantly reduced lifetime between repair/replacement as compared to a die that produces the score pattern of FIG. 8. Reducing the repair/replacement costs lowers the unit cost of the constructible utensil produced from the rotary press.

Figure 9:
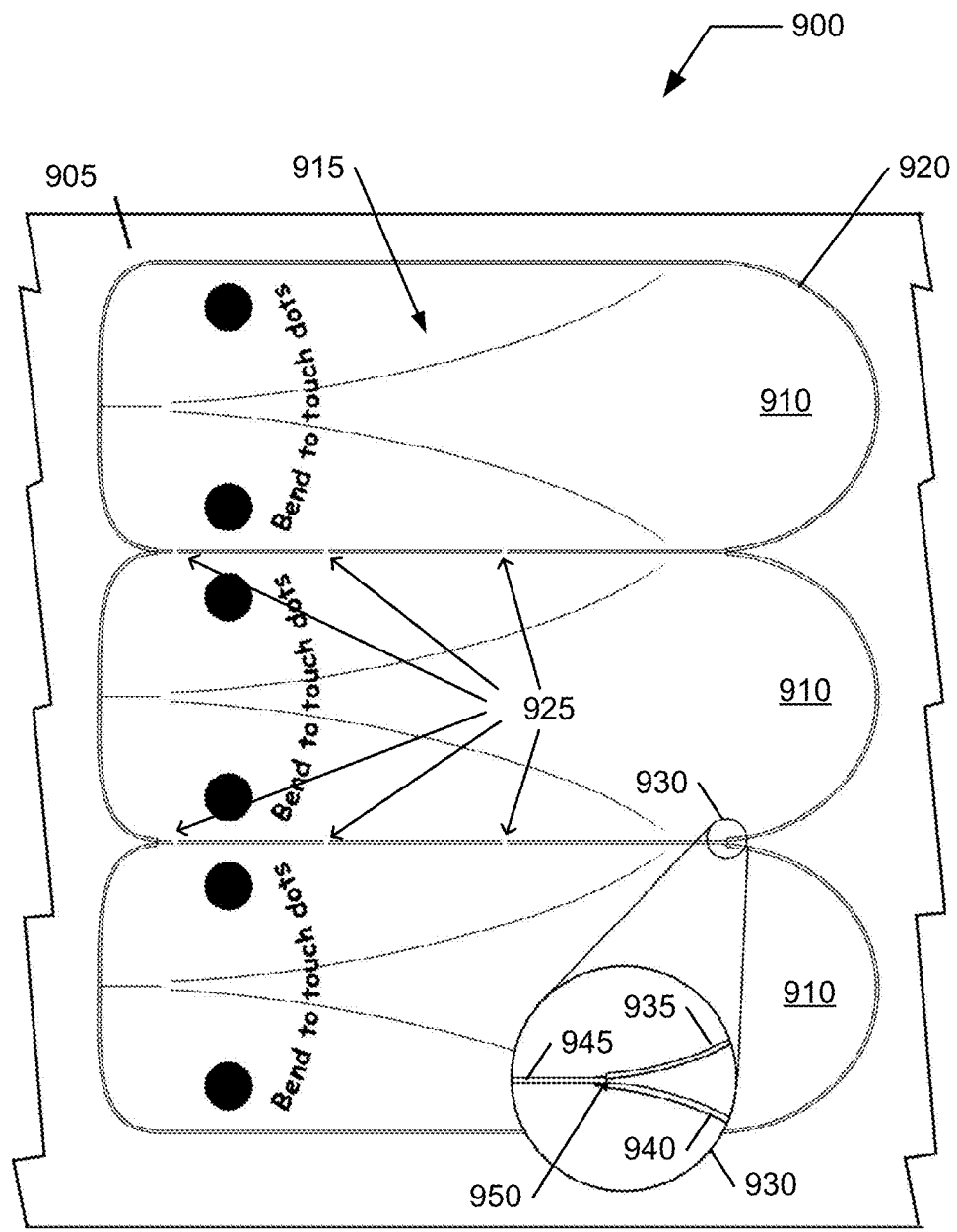

FIG. 9 illustrates an alternate die-cut system 900 that may be produced by a rotary printing process to create a matrix 905 defining a plurality of constructible utensils 910 in a set 915. Set 915 has a completely cut outer perimeter 920 formed by a collection of the steel rules of the rotary die. In this way, set 915 is completely detached from matrix 905 with all constructible utensils 910 of the N rows connected to the nearest adjacent utensil 910 by a series of nicks 925. Each nick 925 is a very narrow uncut line (a minimum connection that is less than $\frac{1}{32}$th inch thick and most preferably the smallest reliable connection width possible considering the material, web speed, and other manufacturing parameters to maintain the connection within desired bounds) that maintains a physical connection and the space between nicks 925 is cut by the die collecting forming an inner perimeter. In FIG. 9, nicks 925 are all on lateral edges of utensil 910 as they are used in between utensils to link them all into set 915, but they are distributed toward the handle and away from the operational element (e.g., the bowl) as described below.

The use of nicks 925 achieves a goal of holding all the N rows of constructible utensils 910 together into set 915 and thereby prevents the cross-entanglement described in the context of FIG. 8. In this way, each set 915 is neatly stacked and a mechanical separation process (machine or by hand) is easily able to separate the individual constructible utensils 910 and allow them to be neatly and efficiently stacked, counted, and packaged. A further advantage is that the sets 915 may be formed at very high-speed achieving one of the goals of cost-reduction.

Unfortunately, a feature of the rotary die that influenced the change in score pattern described above creates a consumer concern. As noted, a consumer can be concerned with sharp protrusions that enter the mouth or that make contact with the tongue. Nicks 925 are one source of sharp protrusions after set 915 is separated into individual constructible utensils 910. As seen in FIG. 9 however, it is possible to move nicks 925 away from the operational element and toward the handle. (The operational element may include a bowl-portion defined by the scores when the utensil is folded, the bowl-portion holding the foodstuff and is that part that is placed into the mouth).

However, in the formation of outer perimeter 920, a plurality of steel rules are used to cut individual segments. Where one steel rule abuts another steel rule to continue a cut, the two steel rules are unable to create a smooth transition from one rule to the other. FIG. 9 identifies a detailed exploded view of a region 930 where two such steel rules come together and abut.

A first outer perimeter segment 935 formed by one steel rule abuts a second outer perimeter segment 940 formed by another steel rule. In system 900, an inner perimeter segment 945 joins the two outer perimeter segment and produces one or more step discontinuities 950. Step discontinuity 950 is another type of sharp protrusion. Unfortunately in system 900, step discontinuity 950 is formed right at the bowl portion and creates an implementation of constructible utensil 910 that is unacceptable for most users when consuming foodstuff. In some implementations, each constructible utensil 910 will be formed with a step discontinuity 950 at each similar location producing an undesirable sharp protrusion on each side of each bowl-portion.

Figure 10:
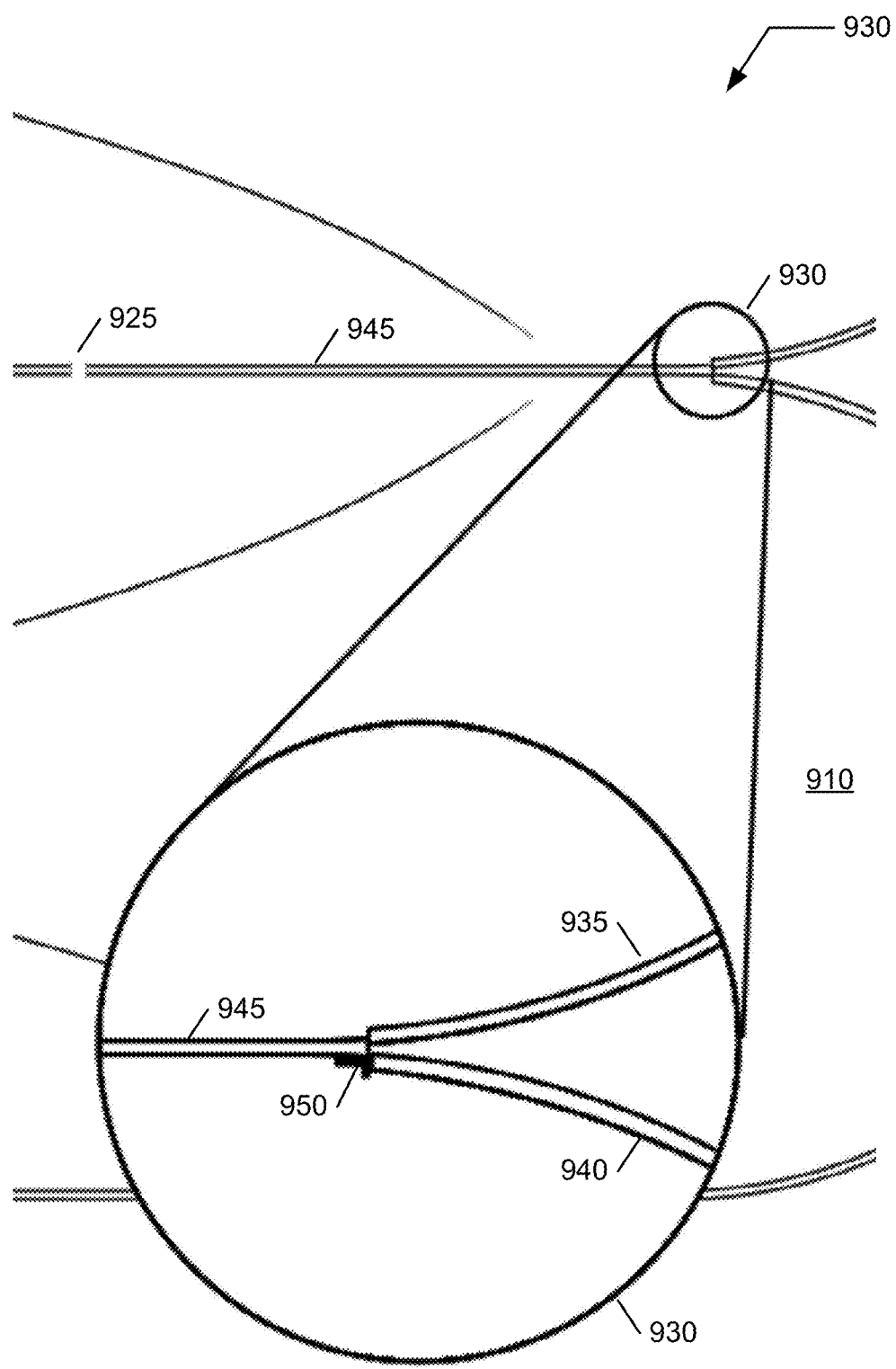

FIG. 10 illustrates a close-up of region 930 identified in FIG. 9 to aid in visualization of step discontinuity 950. The sharp protrusion produced can be quite slight and printers do not appreciate the potential concern as high-speed rotary printing had not been used for printing and manufacturing of constructible utensils before, and because the lack of understanding of the sensitivity of the mouth and tongue with regard to sharp protrusions as slight as formed from the indicated abutment of adjacent die-cutting elements (e.g., the steel rules).

Figure 11:
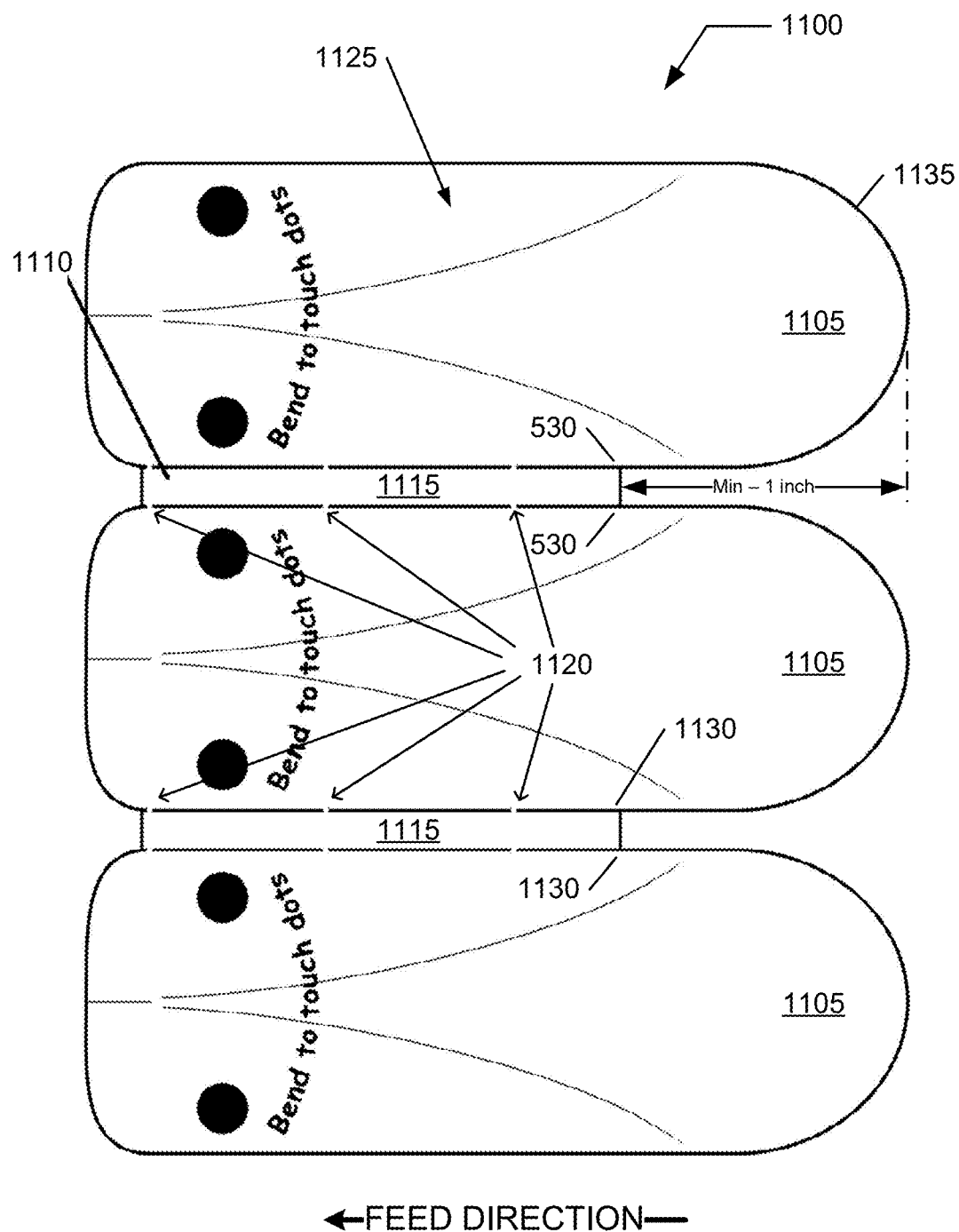

FIG. 11 illustrates a matrix system 1100 for high-speed rotary printing of marketable constructible utensils 1105 defined by a matrix 1110. Matrix 1110 includes a web element 1115 disposed between adjacent constructible utensils 1105 that may be as narrow as ⅛" and about 2" long in practice but physically could be made narrower and shorter. Each web element 1115 includes a plurality of nicks 1120 that attach web element 1115 to the two adjacent utensils 1105 and join them all into a single set 1125. For N number of rows, there will be N−1 web elements 1115 used to form single set 1125. All nicks 1120 are disposed well away from the bowl-portion (indicated in FIG. 11 as a minimum of 1 inch for the disclosed dimensions). Each forward location 1130 where web element 1115 meets an outer perimeter 1135 of single set 1125 is a possible location of a step discontinuity. In contrast to system 900, matrix system 1100 is able to displace any step discontinuity more than 1 inch from the bowl-portion end of constructible utensil.

Because each N constructible utensils 1105 produced each cycle are joined together in set 1125 by matrix 1110 which allows high-speed rotary printing, matrix system 1100 is able to address a goal of cost-reducing individual constructible utensils to achieve retailer acceptance. Ensuring that any sharp protrusions are a minimum of one inch from a bowl-portion end of each constructible utensil enables matrix system 1100 to address a goal of consumer acceptance, thus meeting market acceptance for constructible utensil 1105.

In some instances, matrix system 1100 may be improved because matrix 1110 includes N−1 web elements 1115 for each set 1125. In some situations it can add cost to identify, locate, remove, and manage all the web elements as each web element 1115 may require specialized attention from automated stripping equipment or use of manual labor to perform this task. This is one reason that web elements 1115 are specified at a minimum of ⅛" of width to better facilitate their removal. Improved removal systems enable reduction of the minimum thickness which further improves the costs.

Figure 12:
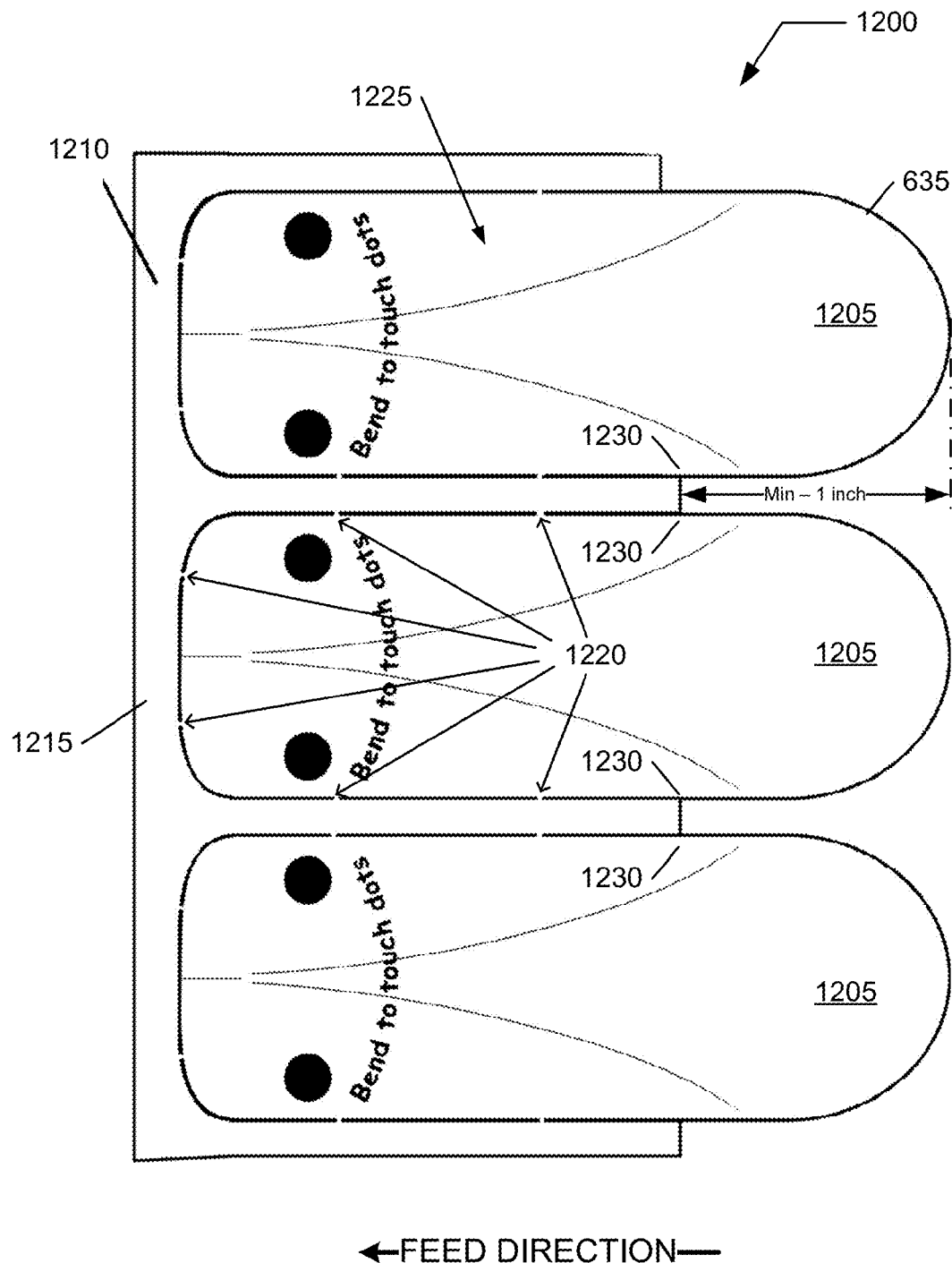

FIG. 12 illustrates a first alternate matrix system 1200 for high-speed rotary printing that addresses a potential drawback of matrix system 1100. Matrix system 1200 produces marketable constructible utensils 1205 defined by a matrix 1210. Matrix 1210 is a single web element 1215 including between-utensil components disposed between adjacent constructible utensils 1205 that may be as narrow as ⅛" in practice but physically could be made narrower, and a cross-utensil component disposed across all the handle portions and in-between utensil components. Web element 1215 includes a plurality of nicks 1220 that attach web element 1215 to all utensils 1205 and join them all into a single set 1225. For N number of rows, web element 1215 will include N−1 between-utensil components and one cross-utensil component to form single set 1225. All nicks 1220 are disposed well away from the bowl-portion (for example, a minimum of 1 inch), with matrix system 1200 including a pair of nicks 1220 attaching each handle portion to matrix 1210. Each forward location 1230 where web element 1215 meets an outer perimeter 1235 of single set 1225 is a possible location of a step discontinuity. In contrast to system 900, first alternate matrix system 1200 is able to displace any step discontinuity more than 1 inch from the bowl-portion end of constructible utensil.

Because each N constructible utensils 1205 produced each cycle are joined together in set 1225 by matrix 1210 which allows high-speed rotary printing, matrix system 1200 is able to address a goal of cost-reducing individual constructible utensils to achieve retailer acceptance. Ensuring that any sharp protrusions are a minimum of one inch from a bowl-portion end of each constructible utensil enables matrix system 1200 to address a goal of consumer acceptance, thus meeting market acceptance for constructible utensil 1205.

Matrix system 1200 addresses a potential concern with matrix system 1100 about individually removing all the discrete web elements. Matrix system 1200 is able to do this because there is a single web element and all the between-utensil components (roughly corresponding to the individual web elements 1115) are attached to cross-utensil component facilitating efficient stripping. Further, having fewer nicks 1220 attaching between-utensil components to constructible utensil 1205 helps to make removal of those components easier.

In some instances, matrix system 1200 may be further improved because matrix 1210 includes N−1 between-utensil components that may interfere with efficient stripping and because matrix 1210 could be wasting web material as there is a minimum spacing between constructible utensils to support the removability of the between-utensil components.

Figure 13:
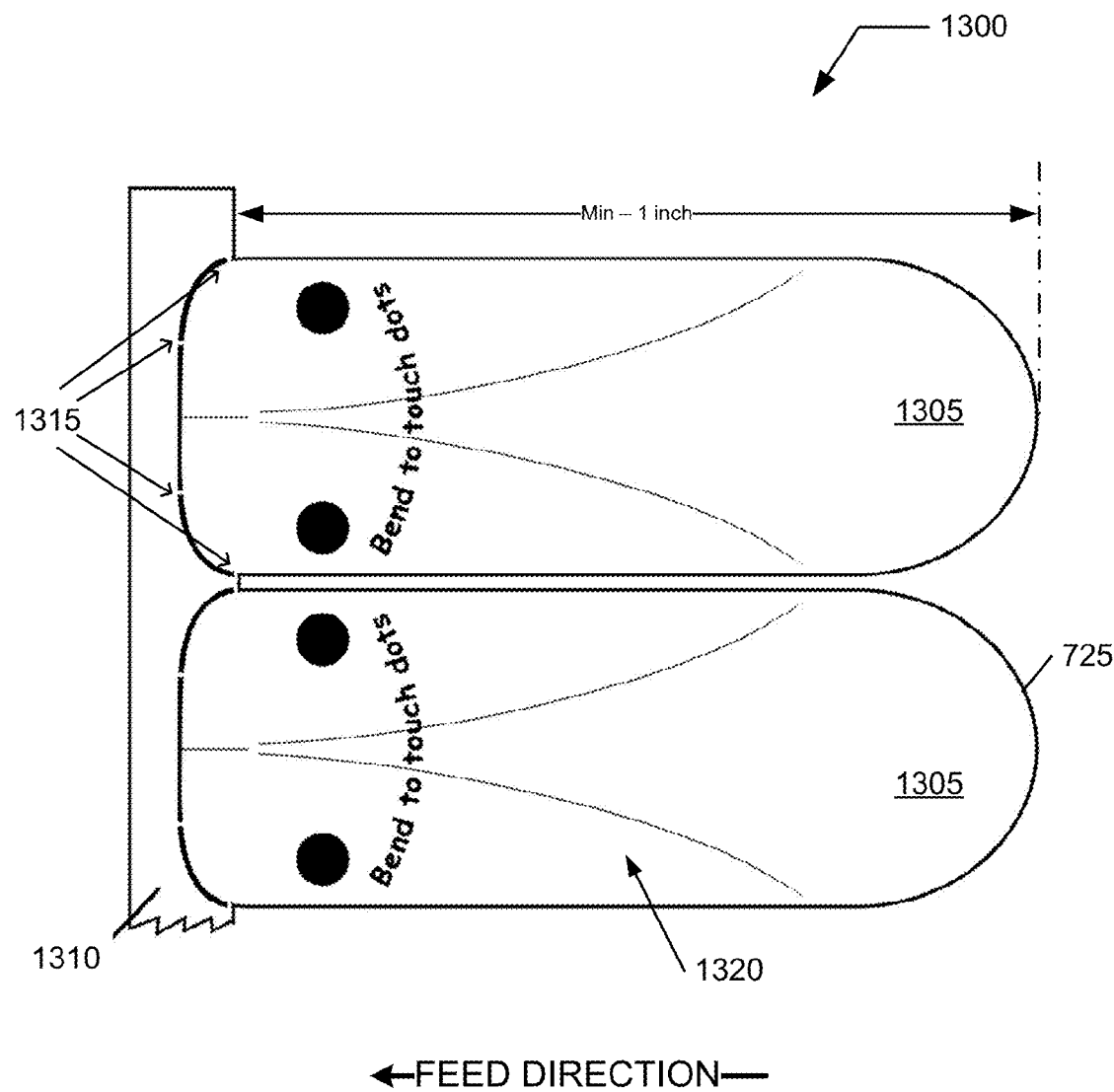

FIG. 13 illustrates a second alternate matrix system 1300 for high-speed rotary printing that addresses a potential drawback of matrix system 1200 (as well as matrix system 1100). Matrix system 1300 produces marketable constructible utensils 1305 defined by a matrix 1310. Matrix 1310 is a single strip of web element and dispenses with between-utensil components between adjacent constructible utensils 1305. Matrix 1310 includes four nicks 1315 that attach the strip of web element to each constructible utensil 1305 and join all constructible utensils 1305 into a single set 1320. Two of the four nicks 1315 are connected to a handle end and the other two nicks are connected to opposing lateral edges of constructible utensil 1305 very near the handle end. The two handle end nicks 1315 would act as a hinge absent the lateral nicks that help to inhibit this hinging rotation between constructible utensils 1305 and matrix 1310. All nicks 1315 are disposed well away from the bowl-portion. There is no forward location where the strip of web element meets an outer perimeter 1325 of single set 1320. A possible location of a step discontinuity does exist near the handle end near where the lateral nicks 1315 are located, thus localizing both sharp protrusions in one area. In contrast to system 900, second alternate matrix system 1300 is able to displace any step discontinuity much more than 1 inch from the bowl-portion end of constructible utensil.

Because each N constructible utensils 1305 produced each cycle are joined together in set 1320 by matrix 1310 which allows high-speed rotary printing, matrix system 1300 is able to address a goal of cost-reducing individual constructible utensils to achieve retailer acceptance. Ensuring that any sharp protrusions are a minimum of one inch from a bowl-portion end of each constructible utensil enables matrix system 1300 to address a goal of consumer acceptance, which when combined with a satisfactory retailer acceptance, meets market acceptance for constructible utensil 1305.

Matrix system 1300 addresses a potential concern with first alternate matrix system 1200 about between-utensil components being hard to remove and potentially wasting material. Matrix system 1300 is able to do this because it removes all the between-utensil components greatly facilitating efficient stripping which allows closer spacing of constructible utensils 1305 within set 1320.

In some instances, matrix system 1300 may be further improved because matrix 1310 could be wasting web material as there is a minimum spacing between constructible utensils in order to shift the potential step discontinuity well away from the bowl-portion.

Figure 14:
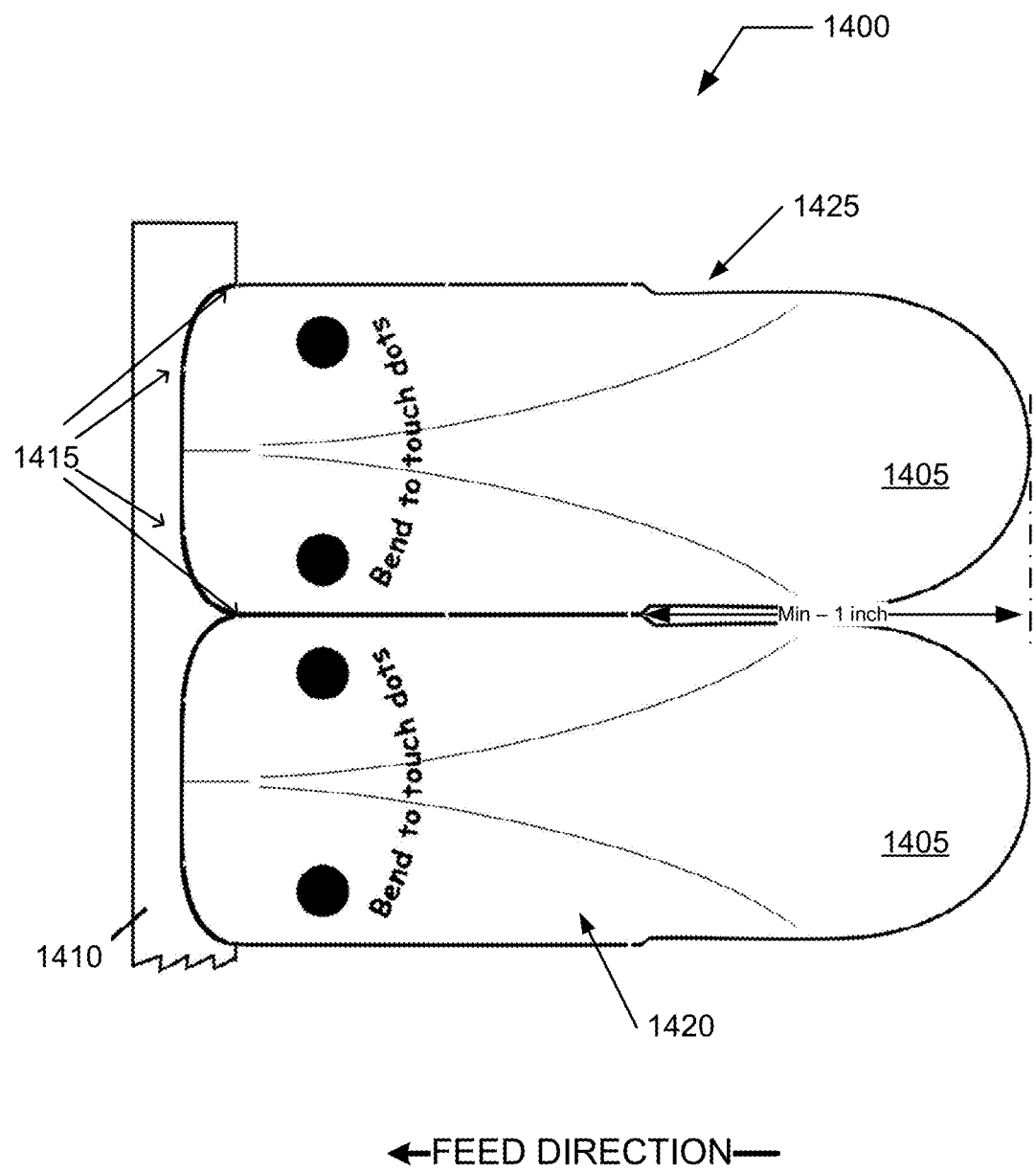

FIG. 14 illustrates a third alternate matrix system 1400 for high-speed rotary printing that addresses a potential drawback of matrix system 1300 (as well as matrix system 1200 and matrix system 1100). Matrix system 1400 produces marketable constructible utensils 1405 defined by a matrix 1410. Matrix 1410 is a single strip of web element that dispenses with between-utensil components between adjacent constructible utensils 1405. Matrix 1410 includes two nicks 1415 that attach the strip of web element to each constructible utensil 1405, as well as a set of nicks 1415 between adjacent handle portions of constructible utensils 1405 that collectively join all constructible utensils 1405 into a single set 1420. All nicks 1415 are disposed well away from the bowl-portion. Where in other matrix systems there was a forward location where various cuts from steel rules would meet within the 1 inch minimum distance, matrix system 1400 shifts the step discontinuity and resulting sharp protrusion by altering a perimeter of constructible utensil 1405 wherever the sharp discontinuity is to be disallowed. Effectively a notch 1425 in the outer perimeter (which alternatively could be created by widening of a portion of the handle perimeter) of each constructible utensil 1405 shifts the step discontinuity towards the handle and away from the bowl-portion. In contrast to system 900, third alternate matrix system 1400 is able to displace any step discontinuity more than 1 inch from the bowl-portion end of constructible utensil.

Because each N constructible utensils 1405 produced each cycle are joined together in set 1420 by matrix 1410 which allows high-speed rotary printing, matrix system 1400 is able to address a goal of cost-reducing individual constructible utensils to achieve retailer acceptance. Ensuring that any sharp protrusions are a minimum of one inch from a bowl-portion end of each constructible utensil enables matrix system 1400 to address a goal of consumer acceptance, which when combined with a satisfactory retailer acceptance, meets market acceptance for constructible utensil 1405.

Matrix system 1400 addresses a potential concern with second alternate matrix system 1300 about potentially wasting material due to the separation between constructible utensils in each set. Matrix system 1400 is able to do this because it nicks handle portions of constructible utensil together and notches out a portion of the perimeter of constructible utensil 1405 near the bowl-portion which allows closer spacing of constructible utensils 1405 within set 1420 while preserving consumer acceptance.

In some instances, matrix system 1400 may be further improved because matrix 1410 could be difficult to remove due to the small gap between the bowl-portions of constructible utensils 1405 that shifts the potential step discontinuity away from the bowl-portion.

Figure 15:
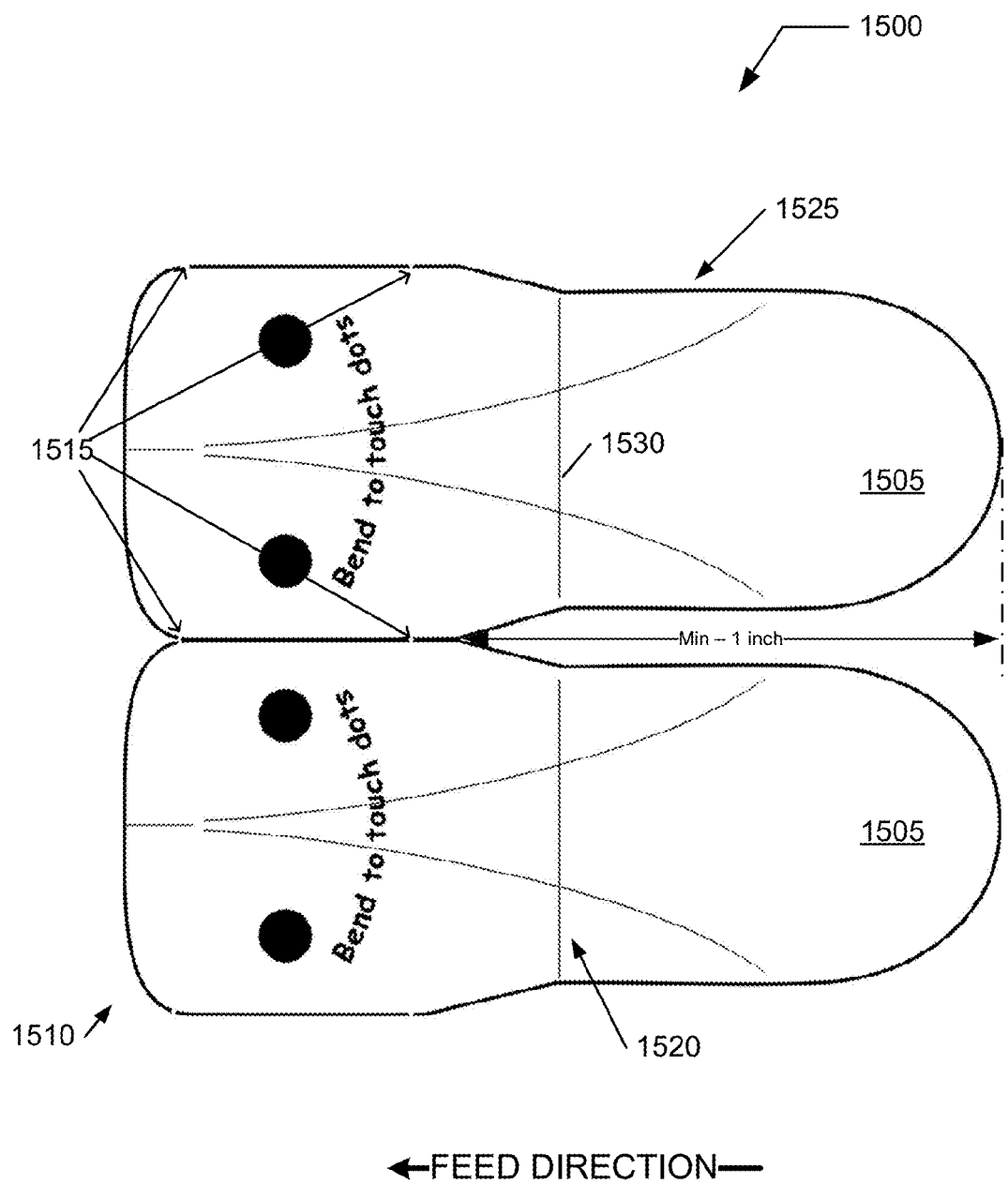

FIG. 15 illustrates a fourth alternate matrix system 1500 for high-speed rotary printing that addresses a potential drawback of matrix system 1400. Matrix system 1500 produces marketable constructible utensils 1505 defined by a virtual matrix 1510. Virtual matrix 1510 dispenses with between-utensil components between adjacent constructible utensils 1505 and non-utensil connecting web elements in which a constructible utensil set is formed by directly nicking individual constructible utensils 1505 together. Virtual matrix 1510 includes a set of nicks 1515 between adjacent handle portions of constructible utensils 1505 that collectively join all constructible utensils 1505 into a single set 1520. All nicks 1515 are disposed well away from the bowl-portion. Like matrix system 1400, matrix system 1500 shifts the step discontinuity and resulting sharp protrusion by altering a perimeter of constructible utensil 1505 wherever the sharp discontinuity is to be disallowed. A much bigger notch 1525 in the outer perimeter (which alternatively could be created by a greater widening of the portion of the handle perimeter) of each constructible utensil 1505 by separating bowl-portions by ⅛" or more shifts the step discontinuity towards the handle and away from the bowl-portion. In contrast to system 900, fourth alternate matrix system 1500 is able to displace any step discontinuity more than 1 inch from the bowl-portion end of constructible utensil.

Because each N constructible utensils 1505 produced each cycle are joined together in set 1520 by virtual matrix 1510 which allows high-speed rotary printing, matrix system 1500 is able to address a goal of cost-reducing individual constructible utensils to achieve retailer acceptance. Ensuring that any sharp protrusions are a minimum of one inch from a bowl-portion end of each constructible utensil enables matrix system 1500 to address a goal of consumer acceptance, which when combined with a satisfactory retailer acceptance, meets market acceptance for constructible utensil 1505.

Matrix system 1500 addresses a potential concern with third alternate matrix system 1400 about potentially increasing stripping inefficiency due to the small spacing between the bowl-portions. Matrix system 1500 is able to do this because it dispenses with any separate web element that needs to be stripped and creates a larger effective spacing between the bowl-portions which improves stripping efficiency of those pieces of the web material.

Matrix system 1500 includes an optional score pattern component that is included in some of the incorporated patent documents. That optional score pattern component includes a lateral score 1530 perpendicular to the longitudinal/fold axis that may be included with any of the constructible utensils described herein. Lateral score 1530 allows constructible utensil 1505 to fold, which makes it more compact when folded. In some instances managing a constructible utensil to efficiently fold it and apply semi-tacky adhesive maintaining the fold until a consumer unfolds it can be challenging and labor intensive. Holding several constructible utensils in a single set can facilitate the folding procedures and make it more manageable.

Figure 16:
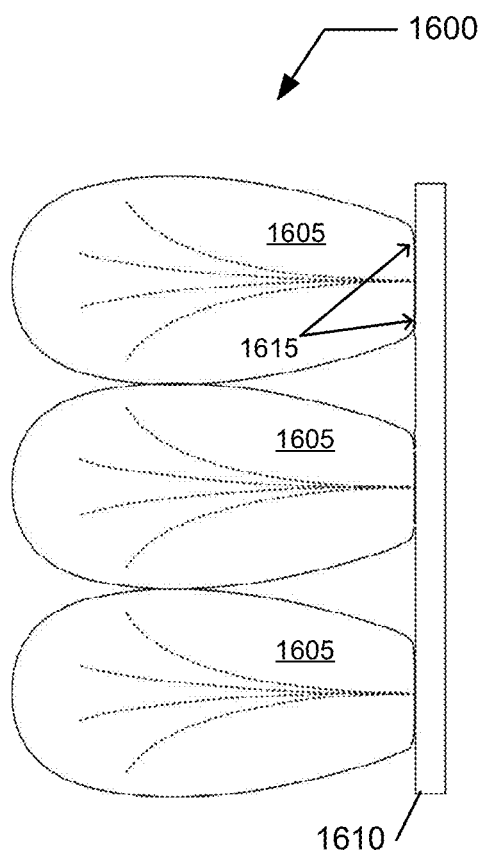

FIG. 16 illustrates a fifth alternate matrix system for high-speed rotary printing in which a different shaped constructible utensil 1605 is defined in a matrix 1610. One or more nicks 1615 (FIG. 16 illustrates a pair of nicks 1615 per constructible utensil 1605) hold constructible utensils 1605 into a single set.

Figure 17:
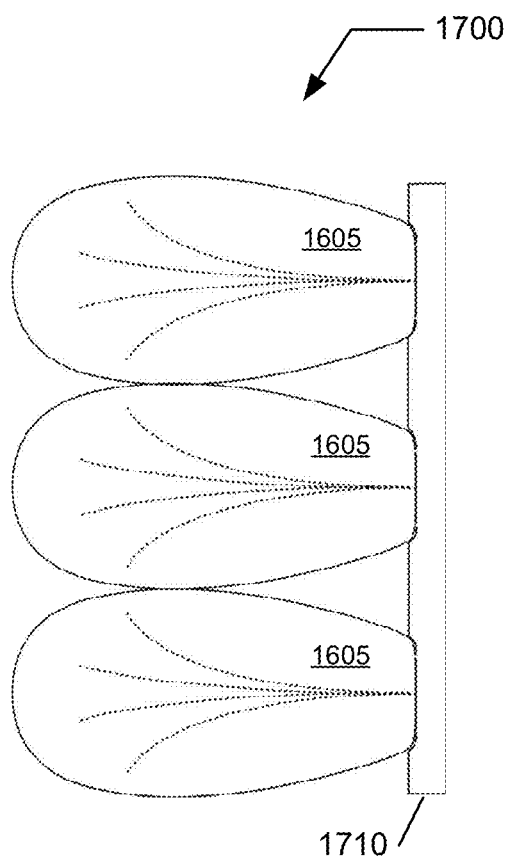

FIG. 17 illustrates a sixth alternate matrix system 1700 for high-speed rotary printing of constructible utensil 1605 with a different matrix 1710 as compared to matrix 1610. Matrix 1705 "bumps" each constructible utensil 1605 into a shallow depression/notch in matrix 1710 to help stabilize the set. As before one or more nicks (e.g., 2 in FIG. 17) attach the handle portion of constructible utensil 1605 into the depression/notch and thus to matrix 1705.

Figure 18:
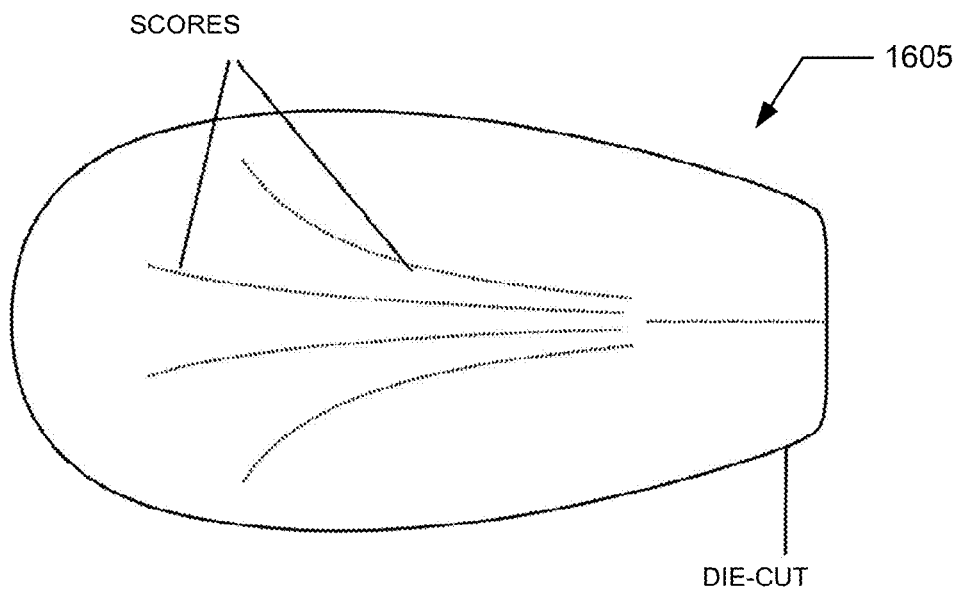
Figure 19:
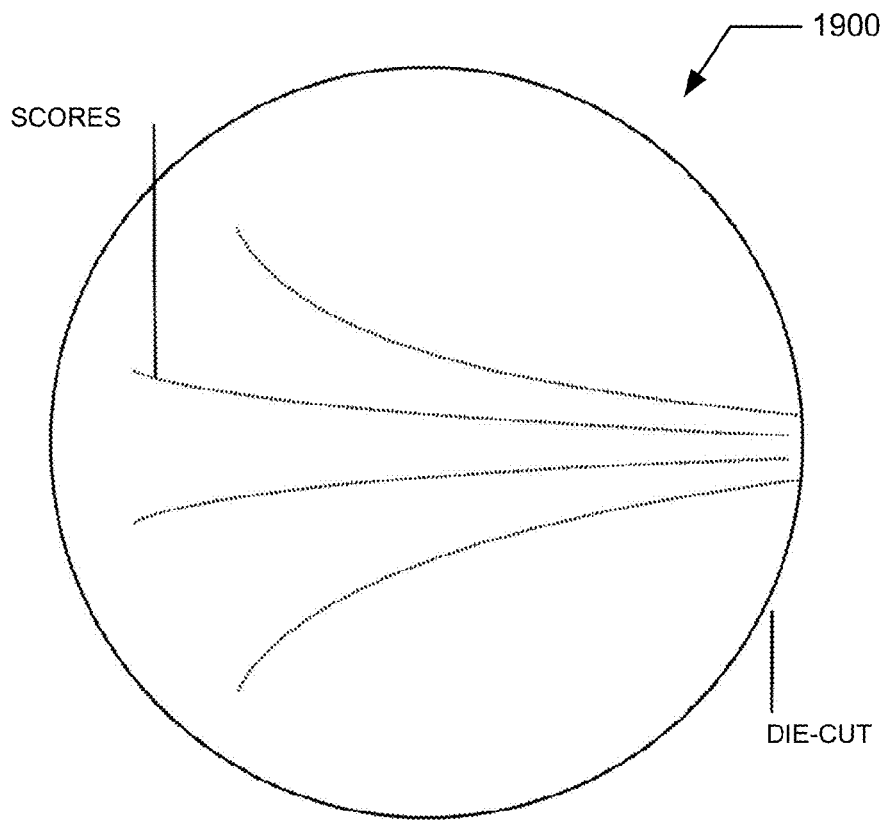

FIG. 18 illustrates constructible utensil 1605 defined by the matrix system of FIG. 16 and FIG. 17; and FIG. 19 illustrates an alternate constructible utensil 1900 that may be defined by the disclosed matrix systems described herein, or modified by the disclosures of the incorporated patent documents.

Not only may the various constructible utensil styles described in the incorporated patent documents be adapted for high-speed printing as described herein, features and structures described herein may be applied to the alternate constructible utensil styles.

The matrix systems described herein, as well as other systems and methods of integrating several constructible utensils into a single set, offers another way to cost-reduce constructible utensils. Rather than stripping individual constructible utensils from the set-producing matrix, several sets may be packaged together and distributed to the retailer. Because the stripping process was not completed, the unit costs may be less but because the constructible utensils are in a set, they may be easily and efficiently handled and shipped. The retailer may have its workers perform the stripping operation at a total lower cost further saving money for the retailer and contributing to retailer acceptance. U.S. patent application Ser. No. 13/797,446 filed 12 Mar. 2013, expressly incorporated by reference thereto, discloses alternate patterns and constructible utensils that may also be advantageously used in cooperation with embodiments disclosed herein.

While some of the figures include an identification of "feed direction" providing an indication of how the web moves through the high-speed printer. In some instances the feed direction may be different from what is illustrated. For example an alternate feed direction may be at right angles to that disclosed or reversed in some implementations.

Cost reduction provided by some of the disclosed embodiments improves as the physical size of the constructible utensil decreases. There are still advantages to be gained from the present invention even for larger utensils, for example the creation of sets of utensils and the processing and cost advantages that can result from their implementation and use. In some cases, sets may be implemented for lower speed manufacturing, such as sheet-fed printing.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Utensilwrap

Embodiments of the present invention provide a system and method for associating a constructible utensil with a container. The following description is presented to enable one of ordinary skill in the art to make and use the invention and is provided in the context of a patent application and its requirements.

Figure 20:
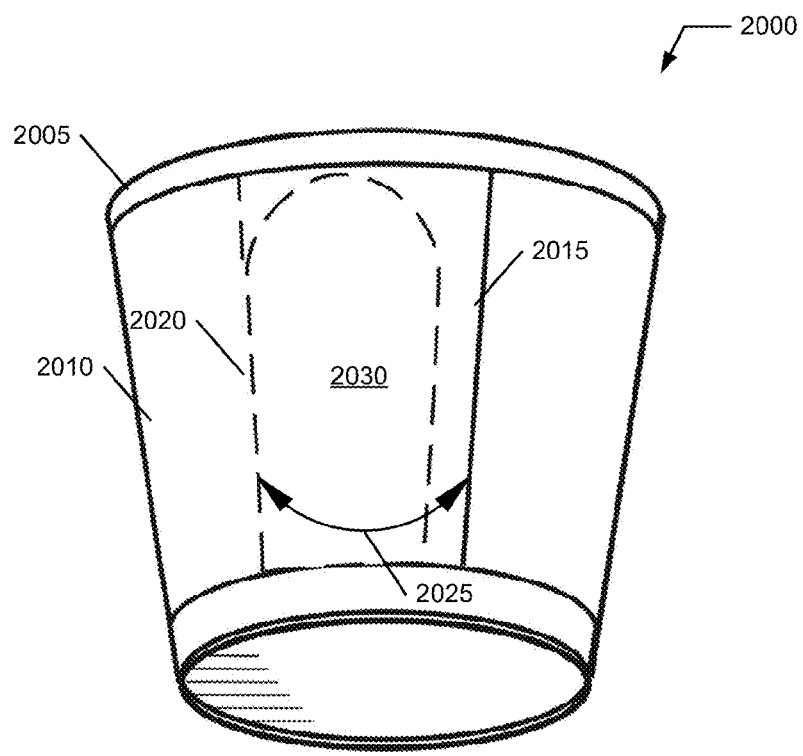
FIG. 20-FIG. 26 illustrate features and structures of a container including an overwrap defining a constructible utensil.
Figure 21:
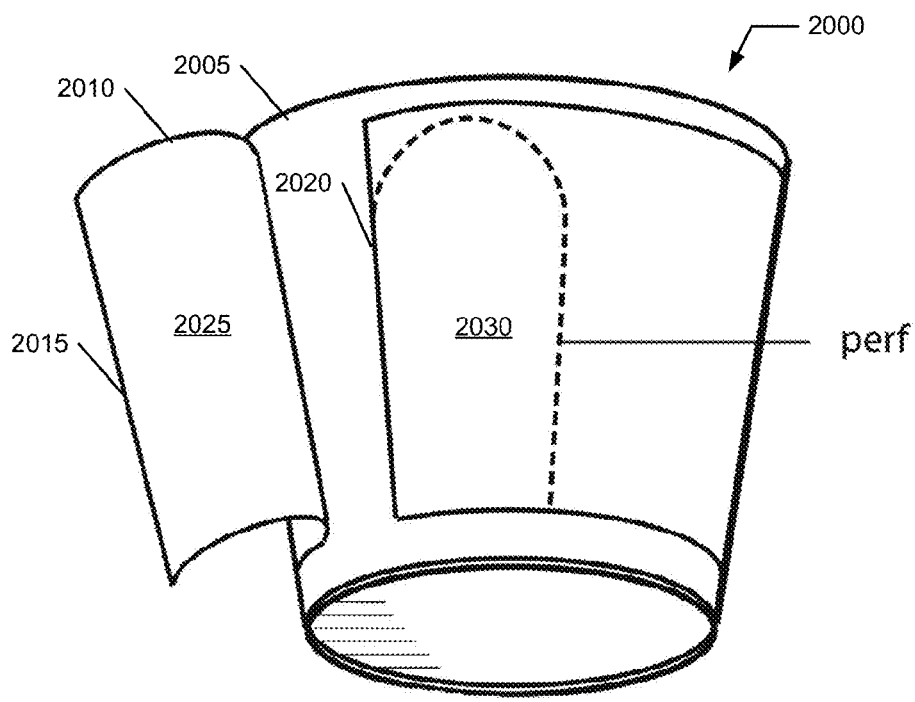

FIG. 20 illustrates a constructible utensil delivery system 2000 including a container 2005 with an overwrap 2010 as delivered to a prospective consumer. FIG. 21 illustrates constructible utensil delivery system 2000 with overwrap 2010 partially pulled back to reveal the integrated unconstructed constructible utensil. Container 2005 is illustrated as an inverted regular conical frustum having a top opening, a bottom base, and a sidewall extending between the bottom base and the top opening. The sidewall defines a cavity for receipt and storage of a foodstuff and a lid closes and seals the top opening. Container 2005 is often made of a thin-walled plastic material. Container 2005 is used in the description of the embodiments of the present invention, it being understood that container 2005 may vary greatly in shape, length, height, and width from what is shown. Container 2005 may be implemented in other regular and irregular shapes, such as for example a regular or irregular parallelepiped having rectilinear faces. For a food container, typically there is a planar base (e.g., circular, elliptical, square, rectangular, or other regular or irregular polygon having 5-8 sides), and a top opening parallel to the base, with one or more sidewalls extending from the base to the opening defining the cavity.

Overwrap 2010 is a stiff yet flexible paperboard material that has the properties required of a constructible utensil (thickness, stiffness, bendability, and the like) to be delivered by constructible utensil delivery system 2000. Some implementations may not be paperstock but may be paper-like (e.g., other plant fiber besides tree fiber) or a calcium carbonate or an environmentally-friendly suitable material that can be biodegradable and/or compostable, the materials as described herein.

Overwrap 2010 is sized and shaped to preferably extend more than once around a container perimeter defined as the collection of all the sidewalls. By extending more than once around the container perimeter, overwrap 2010 includes a free end 2015 that overlaps a fixed end 2020, the magnitude (length) of an overlapping portion 2025 may be adjusted as described herein. Overwrap 2010 is fixed to an outside exterior of the sidewall in many different ways. For example, fixed end 2020 may be adhered to the outside exterior using an adhesive that is semi-tacky or permanent. A permanent adhesive ensures that overwrap 2010 remains attached to container 2005. A semi-tacky adhesive allows overwrap 2010 to be removed after use.

Free end 2015 is releasably secured (e.g., to a section of overwrap 2010) using a semi-tacky releasable adhesive. The releasable adhesive or other securing mechanism secures free end 2015 to overwrap 2010 in a way that holds overwrap 2010 in place during shipment and distribution yet is releasable to permit free end 2015 to be unsealed and opened. Some implementations may further employ a sealed plastic bag or a second level overwrap that is shrink-wrapped or the like to container 2005 which secures overwrap 2010 in position.

A section of overwrap 2010 covered by overlapping portion 2025 includes a constructible utensil 2030. Constructible utensil 2030 is defined in or integrated with the section of overwrap 2010 that is covered over by overlapping portion 2025. For constructible utensil delivery system 2000, constructible utensil 2030 is completely covered by overlapping portion 2025 which helps maintain it in a sanitary and clean condition to properly be used for serving foodstuff to be eaten.

Constructible utensil 2030 has a length and width, the length greater than the width and with the length equal to or less than a width of overwrap 2010. Constructible utensil 2030 is disposed vertically (the length extending between the bottom base and the top opening and the width extending along the container perimeter). In this way, a reduced amount of overwrap 2010 may be used (e.g., the length of overwrap 2010 may just sufficient to cover constructible utensil 2030 before removal and the width of overwrap 2010 is just greater than the length of constructible utensil 2030 giving enough perimeter around the utensil to hold it into place).

Constructible utensil 2030 is preferably defined in the section of overwrap 2010 to be covered up by overlapping portion 2025 using a series of perforations or other defined-tear-propagation technique that allows a consumer to remove constructible utensil 2030 from overwrap 2010. That portion of overwrap 2010 defining constructible utensil 2030 cannot have permanent adhesive (but may use semi-tacky adhesive) holding overwrap 2010 to the sidewall or the consumer would not be able to remove constructible utensil 2030. Permanent adhesive would have to be used outside the perimeter of constructible utensil 2030. Note that it is preferred, but not required, that free edges of constructible utensil 2030 match, or are otherwise preformed by shaping, fixed end 2020. Thus a handle and one lateral edge do not need to be torn or removed to separate constructible utensil 2030 from overwrap 2010. Other implementations may have a greater extent of perforations extending around a perimeter of constructible utensil 2030, requiring more removal time and effort for a consumer, which can risk inadvertent damage to constructible utensil 2030 as it is removed.

In operation, the consumer lifts free end 2015 and peals overlapping portion 2025 off of container 2005 to reveal the underlying constructible utensil 2030 defined in the revealed portion of overwrap 2010. The consumer separates off constructible utensil 2030 from overwrap 2010 to hold an independent and discrete unconstructed constructible utensil 2030 in hand. The consumer, if not having already done so, exposes the foodstuff-containing cavity of container 2005 (e.g., removing the lid from the top opening) and constructs constructible utensil 2030 to produce a utensil that the consumer then uses to consume the foodstuff from container 2005.

Figure 22:
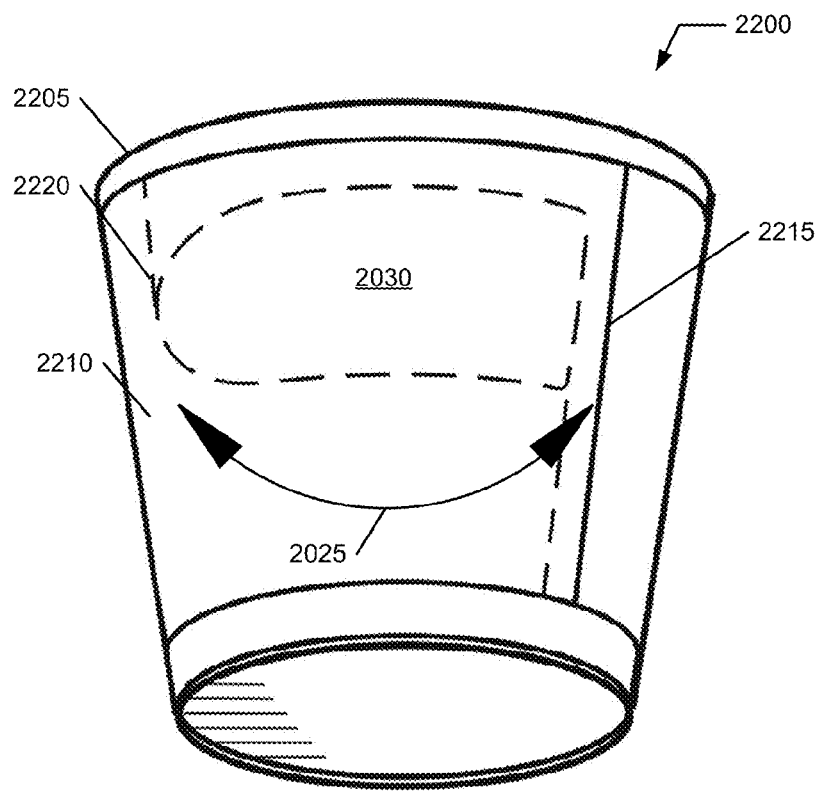
Figure 23:
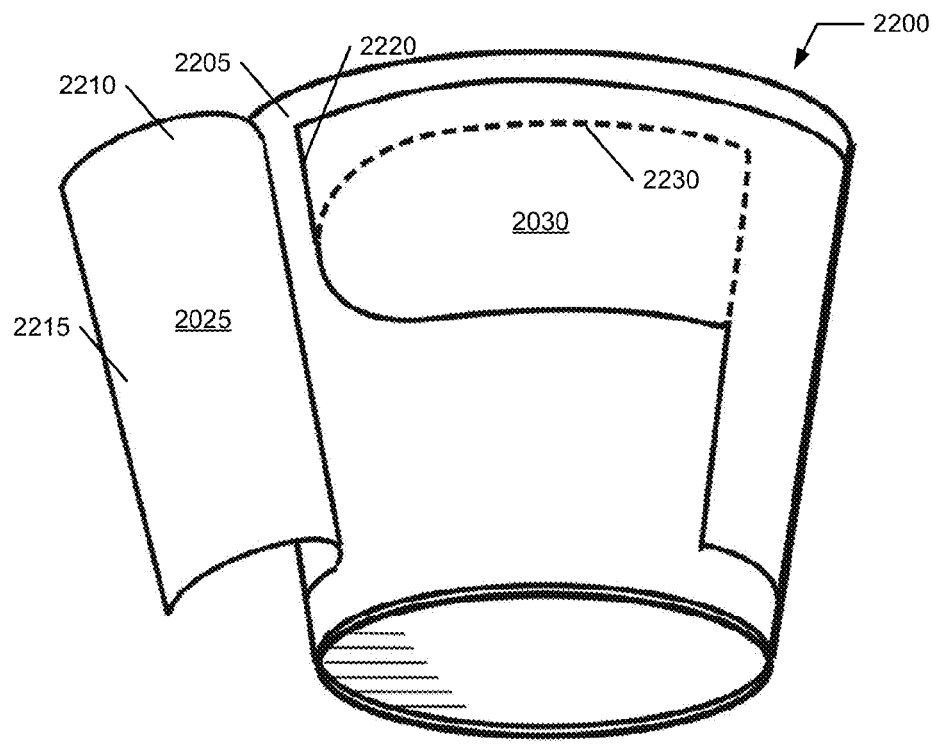

FIG. 22 illustrates a first alternate constructible utensil delivery system 2200 including a container 2205 with an overwrap 2210 as delivered to a prospective consumer. FIG. 23 illustrates first alternate constructible utensil delivery system 2200 with overwrap 2210 partially pulled back to reveal the integrated constructible utensil 2030. Except as expressly detailed, or where context clearly requires a different conclusion, components and elements of first alternate constructible utensil delivery system 2200 conform to the corresponding components and elements of constructible utensil delivery system 2000 described herein. Differences between first alternate constructible utensil delivery system 2200 and constructible utensil delivery system 2000 include orientation of constructible utensil 2030 horizontally (the length extending in the direction of the container perimeter and the width extending between the bottom base and top opening) instead of vertically a free end 2215 covering a greater overlapping portion 2025 (at least a length of constructible utensil 2030 rather than its width) and a fixed end 2220 illustrating a utensil definition that can also make it easier for a consumer to identify and access constructible utensil 2030 once overlapping portion 2025 is peeled away.

As illustrated, fixed end 2220 is notched and preformed having portions of free lateral edges of constructible utensil 2030 pre-cut and exposed from fixed end 2220 and a limited perforation 2225 added which reduces the amount of tearing required to remove. This is consistent with an implementation of constructible utensil delivery system 2000 described herein. In some implementations, fixed end 2220 is square across its entire width and would require more time and effort to remove, possibly increasing risk of inadvertent damage to constructible utensil 2030 during removal.

There are reasons why a manufacturer may prefer an implementation of first alternate constructible utensil delivery system 2200 over constructible utensil delivery system 2000. These reasons include a height of container 2005 (or a width of overwrap 2010 associated with container 2005) being less than a desired length of constructible utensil 2030 or the manufacturer preferring a horizontal disposition of constructible utensil 2030 on container 2205 (such to present advertising/marketing copy using overwrap 2010 (or overwrap 2210) or constructible utensil 2030 in a particular way). U.S. patent application Ser. No. 13/797,446, hereby expressly incorporated by reference in its entirety for all purposes, includes alternative shapes for constructible utensil 2030, score patterns and some discussion regarding adjustments of length of a constructible utensil 2030 that could impact orientation of the utensil and dimensions of the overwrap.

Figure 24:
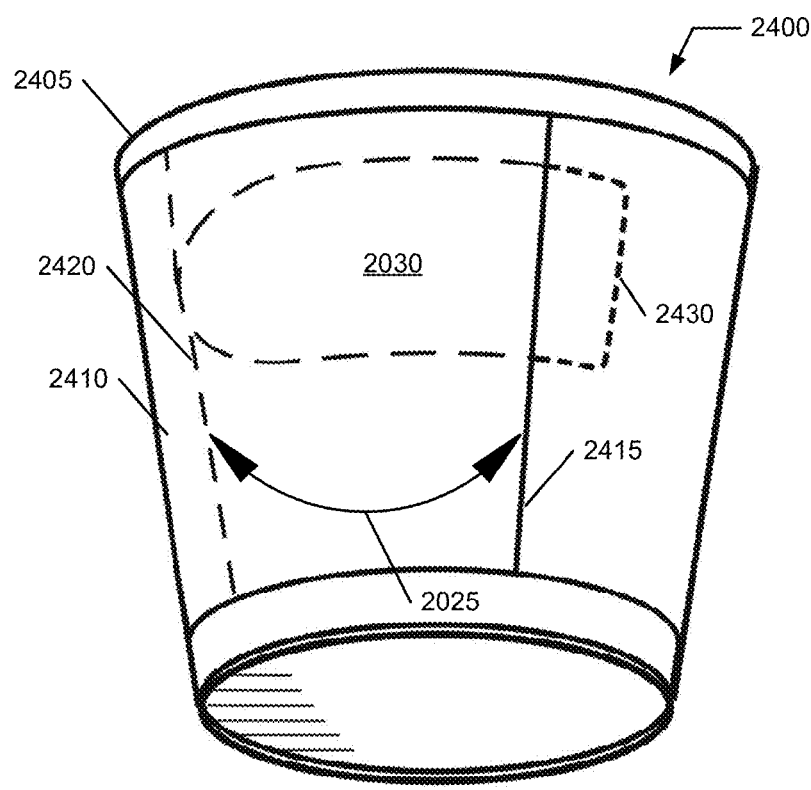
Figure 25:
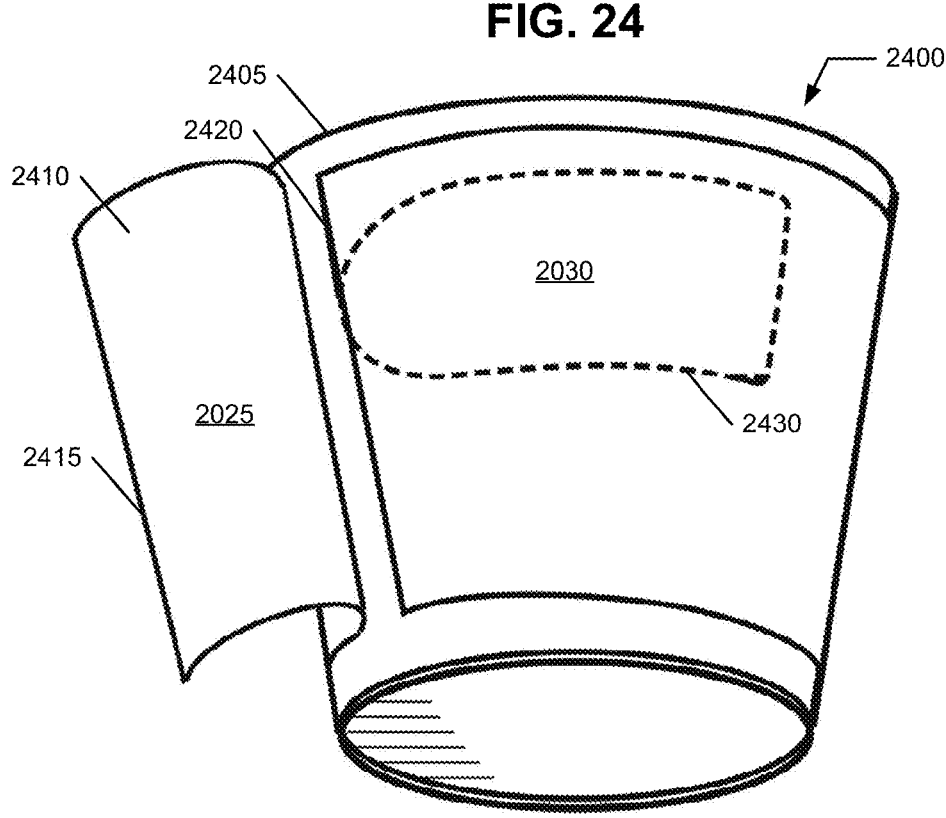

FIG. 24 illustrates a second alternate constructible utensil delivery system 2400 including a container 2405 with an overwrap 2410 as delivered to a prospective consumer. FIG. 25 illustrates second alternate constructible utensil delivery system 2400 with overwrap 2410 partially pulled back to reveal the integrated constructible utensil.

Except as expressly detailed, or where context clearly requires a different conclusion, components and elements of second alternate constructible utensil delivery system 2400 conform to the corresponding components and elements of first alternate constructible utensil delivery system 2200 described herein. Differences between second alternate constructible utensil delivery system 2400 and first alternate constructible utensil delivery system 2200 include a magnitude of overlapping portion 2025 (i.e., it covers only a portion of constructible utensil 2030 exposing a rear end of the handle portion while sealing and protecting an opposing food-contacting functional end, and fixed end 2420 is illustrated completely square and therefore a perforation line 2430 extends completely around the utensil perimeter (except in some cases for a very small area where the opposing food-contacting functional end aligns with fixed end 2420).

As illustrated, fixed end 2420 is NOT notched and preformed. More copy space is provided on overwrap 2410 in this configuration (access when free end 2415 is peeled away) which may be desirable in that overwrap 2410 may be shorter than overwrap 2210 for the same container and constructible utensil as overlapping portion 2025 is shorter in second alternate constructible utensil delivery system 2400.

There are reasons why a manufacturer may prefer an implementation of second alternate constructible utensil delivery system 2400 over constructible utensil delivery system 2000 (similar to the reasons of selecting first alternate constructible utensil delivery system 2200 over constructible utensil delivery system 2000) or over first alternate constructible utensil delivery system 2200. These reasons include reducing a manufacturing cost by reducing a length of overwrap 2410 as compared to overwrap 2210 to partially expose the horizontally disposed integrated constructible utensil 2030 and/or improving consumer awareness of the availability of constructible utensil 2030 prior to the consumer's purchase of a food container. A consumer unfamiliar with constructible utensil delivery system 2000 or first alternate constructible utensil delivery system 2200 may not realize that a constructible utensil is available for use and may therefore forego purchase. Second alternate constructible utensil delivery system 2400 may address some of those concerns of the consumer without contaminating the food-contacting end. In this sense, partially exposing a vertically disposed constructible utensil is not preferred when the associated container includes foodstuff. However as other contexts exist for a container requiring a dispensing utensil for non-foodstuff contents, in some instances a partially exposed vertically disposed constructible utensil may be implemented without the same concerns about preservation of a sanitary condition for the non-food-contacting portion of constructible utensil 2030 (which is the food-contacting portion for foodstuff containers).

Figure 26:
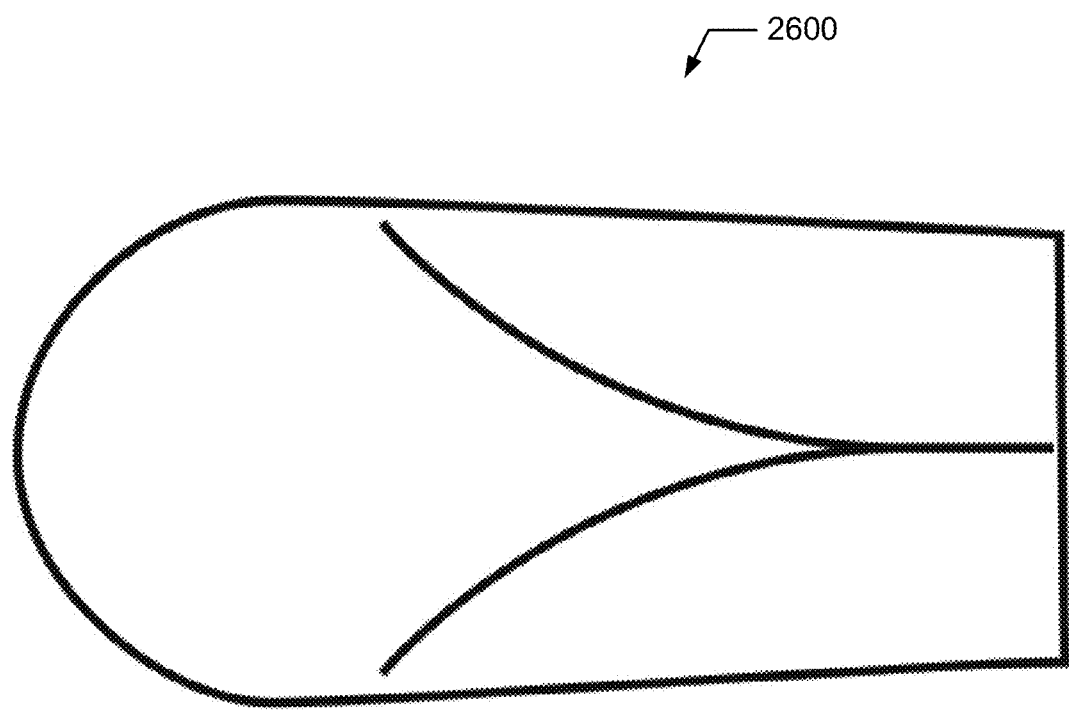

FIG. 26 illustrates a representative unconstructed constructible utensil 2600 that may be used as constructible utensil 2030 in the embodiments of FIG. 20-FIG. 25. Constructible utensil 2600 includes a general "bullet" shape having linear lateral free edges, a linear rear end edge and a curvilinear front end edge. A pair of curved scores that converge from lateral edges of a food-contacting portion towards a central longitudinal fold axis at linear rear end edge is a simple implementation for constructible utensil 2030. Folding constructible utensil 2600 about the central longitudinal fold axis propagates a bowl-inducing distortion that creates a three-dimensional bowl in food-contacting portion. There are alternative implementations of the utensil perimeter and score disposition and arrangement, some of which are disclosed herein or in the incorporated patent and patent applications.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Extended Utensil Features

Embodiments of the present invention provide a system and method for meeting market demand for better constructible utensils. The following description is presented to enable one of ordinary skill in the art to make and use the invention and is provided in the context of a patent application and its requirements.

It should be noted that the figures include specific shapes, paths, and arrangements of scores used to facilitate formation of three dimensional bowls as a part of a body is folded. The scores have been illustrated to accurately present representative suitable score paths for the particular utensil type and application, particularly with respect to location, arrangement, and placement.

The constructible utensils disclosed herein are generally representative of a wide range of constructible utensils, some of which have been illustrated and described in related patents and patent applications.

In some cases, because a preferred embodiment includes environmentally friendly materials which often include paper and paper-like substances, special processing may be necessary or desirable. For example, it may be desirable to include a coating or other structure configured as a moisture-barrier (that additionally has a consumer-friendly mouth feel which may include, for example a smoothness and slipperiness). For a utensil, it is the case that the foodstuff may have a significant moisture content. To enhance longevity in terms of preserving structural integrity and strength over the serving/portion size, moisture resistance is important in some implementations. Such utensils may be processed to enhance function (e.g., coated with environmentally appropriate material) to resist premature degradation during use (e.g., a moisture-barrier) or it may be manufactured of a moisture-barrier material (e.g., calcium carbonate or the like), collectively a coating, or inherent characteristic or other moisture protection system is referred to as moisture-barrier property.

Some preferred embodiments include a paperboard sheet material. In some of the descriptions, there are certain score lines that are specifically set forth to be close to, but spaced away from, an edge of a body or body element of a constructible utensil. For some materials, these scores break down fiber used in the body and could increase moisture absorption. Spacing a terminating end of these score lines away from the physical edge improves moisture absorption resistance.

The preferred embodiments use sustainable tree-based wood fibers due to improved material properties. In some applications, and as additional materials are developed, other materials (such as shorter fibers from other plants or mineral-based substrates) may be used in lieu of tree-based wood fibers. Additionally, the preferred embodiments describe implementations that include multiple curved scores, including multiple curved scores that "bend" inwardly towards each other. Some implementations may include other configurations, including a single curved implementation that produces a bowl when folded along this score.

Some of the disclosed embodiments include configuration changes to a basic constructible single-use taster.

The constructible taster includes a generally "bullet" shaped perimeter having a longitudinal axis about which the constructible taster is generally symmetric. The perimeter is about 1.25 inches wide and about 3.125 inches long (the "bullet" shaped perimeter including a generally rectangular body that is about 1.25 inches×about 2.5625 inches and a semi-disk at one end of the rectangle having a radius of about 0.5625 inches). A handle portion is joined to a functional end with handle portion including a short handle score extending along the longitudinal axis and joining a pair of curved scores extending from lateral edges of the functional end located at a distal end (e.g., opposite of the handle portion at a proximal end). In some implementations the handle score may be omitted, its function provided by an extension of one or more of the curved scores extending towards the proximal end from the distal end. Folding/deforming the proximal end along the handle score (or handle score substitute) induces the deformation of the functional end about the one or more curved scores to create a three-dimensional structure (generally described as arched or bowl-shaped) which adds strength/rigidity and function, such as retaining low-viscosity foodstuff.

The tasters are generally small and the constructible taster is particularly configured to reduce material use while providing efficient operation. A size and shape of a bowl formed in the constructible taster at the distal end is determined, again, by the arrangement of the scores with respect to the body and its structures. For example, in the preferred embodiment, the scores are close to lateral edges of the body near the distal end (without reaching the edge to improve mouth feel by reducing sharp edges) and converge to a central fold axis near the proximal end and produce the desired bowl shape. The scores are gentle and convex with respect to the fold axis and curve over almost the entire length of the rectilinear body and do not meet until very close to the edge. For purposes of this application in the context of a taster, the scores converge within 33% of the length of the body element from the handle end and most preferably within 10% of the length from the handle end. At the other end, the scores reach near the lateral edges at points greater than 50% of the length and most preferably at points greater than 75%.

Included with the constructible taster are informational indicia (e.g., specifically positioned dots) that identify a preferred location for squeezing/deforming the handle portion. (E.g., "bend to touch dots" associated with a pair of indicia (e.g., dots) which recreate the desired deformation in the handle to help optimize formation of the functional element.) Preferably these indicia are placed near where the scores converge. In this case, towards the proximal end of the body, so that the body gradually distorts along scores generally over the entire length.

In some embodiments it will be desirable to provide some type of mechanism to maintain the lateral edges of the body (e.g., near the indicia) in a generally folded arrangement to preserve a desired minimum capacity/shape to the formed bowl (and to maintain those lateral edges extending upwards to be easily grasped to permit The constructible taster to be picked up from a work surface, especially with the bowl shape retained). The material selection of the body and the depth and nature of the formation of the scores are one way to provide for a retaining force resisting unfolding when a folding force is removed. In other embodiments, some type of tacky adhesive or interconnecting tabs may be used to hold the lateral edges together and the body in the folded mode.

In addition to the disclosed designs, the incorporated patents and patent applications describe alternate score patterns and perimeter shapes for the constructible taster, and other constructible utensils described herein. Those alternates may be combined with the basic taster and further modified as described herein in keeping with the present invention.

Figure 27:
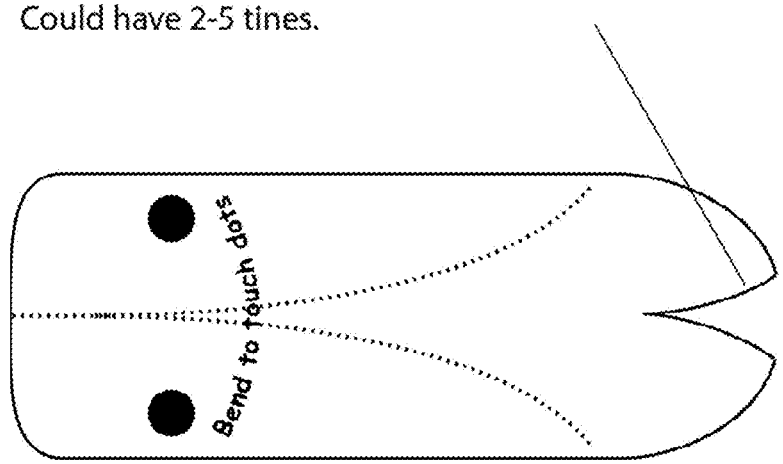

FIG. 27 illustrates a constructible utensil including an exterior perimeter and a score pattern configured to produce a constructible spork. The constructible spork of FIG. 27 is a modification of the constructible taster and includes a bowl-producing score pattern with the forward free curvilinear edge including 2 tines, with 2-5 tines possible with different perimeter notching. The tines of the constructible spork helps to spear and catch noodles, salads, fruit salads and the like.

Figure 28:
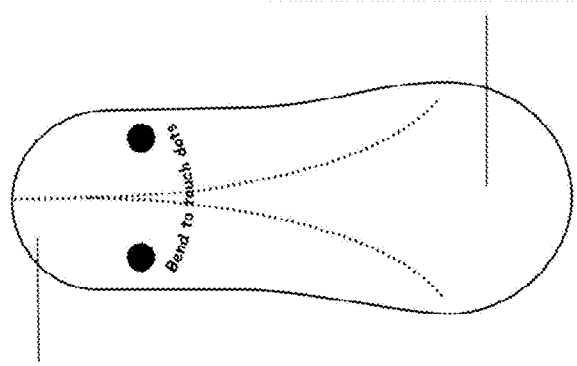

FIG. 28 illustrates a constructible taster utensil including an exterior perimeter and a score pattern configured to produce a constructible taster having a widened operative element. The constructible taster utensil of FIG. 28 is a modification of the constructible taster and includes a widened spoon end (i.e., the functional end) whereas other constructible utensils described or incorporated herein have a uniform width or a widened handle end. The constructible taster utensil of FIG. 28 aids the consumer and can help to reduce material usage during manufacturing.

Figure 29:
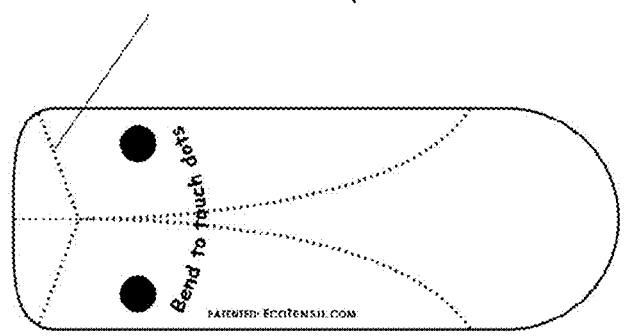
Figure 29:
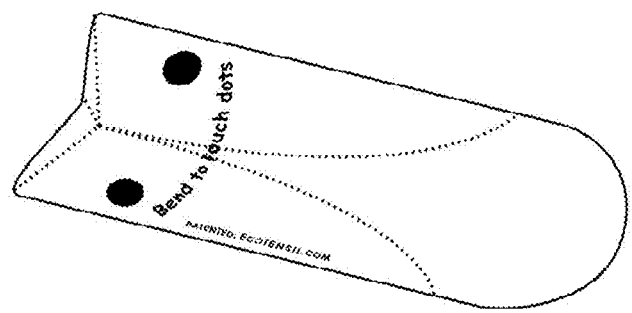

FIG. 29 illustrates both an unconstructed and constructed constructible utensil including an exterior perimeter and a score pattern configured to produce a constructible utensil having a backstop. The constructible taster utensil of FIG. 29 is a modification of the constructible taster and includes a score pattern having backstop scores at the end of the handle portion. When needed or desired, a consumer is able to fold up the backstop along the backstop scores to create a dam that prevents contents (e.g., liquids) from spilling off the back end of the handle. The backstop scores include a pair of linear scores extending from a common point on the longitudinal axis back towards rear corners of the handle portion. Those scores, combined with a longitudinal score extending from an edge of the handle towards the functional end (which is sometimes present in certain implementation of the constructible taster) cooperate with the pair of linear scores to selectively produce the independently operable backstop. The backstop is independent from the bowl-producing scoring pattern as the user may or may not use the backstop with a folded and constructed utensil.

Figure 30:
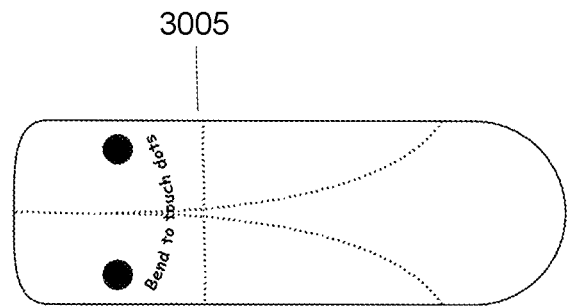

FIG. 30 illustrates a constructible taster utensil including a perpendicular score for length-shortening folding. The constructible taster utensil of FIG. 30 is a modification of the constructible taster and includes a perpendicular (e.g., to the longitudinal axis and/or the fold axis) fold to allow the constructible taster utensil to be length collapsible to fit on small packages. Even though the constructible taster is typically configured to be very short, there are applications in which it is desired to have a shortened constructible taster, such as inclusion in certain small footprint foodstuff containers (e.g., food samples and the like). Also the constructible taster utensil frequently needs to be longer than the side or top of a container so it can reach into the container and still have length for the consumer to hold the handle end. FIG. 30 includes a perpendicular fold 3005 to allow spoon to be collapsible to fit on small packages. Spoon frequently needs to be longer than the side or top of a container so it can reach into the container and still have length for user to hold the handle end.

The perpendicular fold enables a pre-constructed length of constructible taster utensil to shortened for packaging. Depending upon a location, the folded length may be shortened anywhere from 50% to 75% of the unfolded length.

Figure 31:
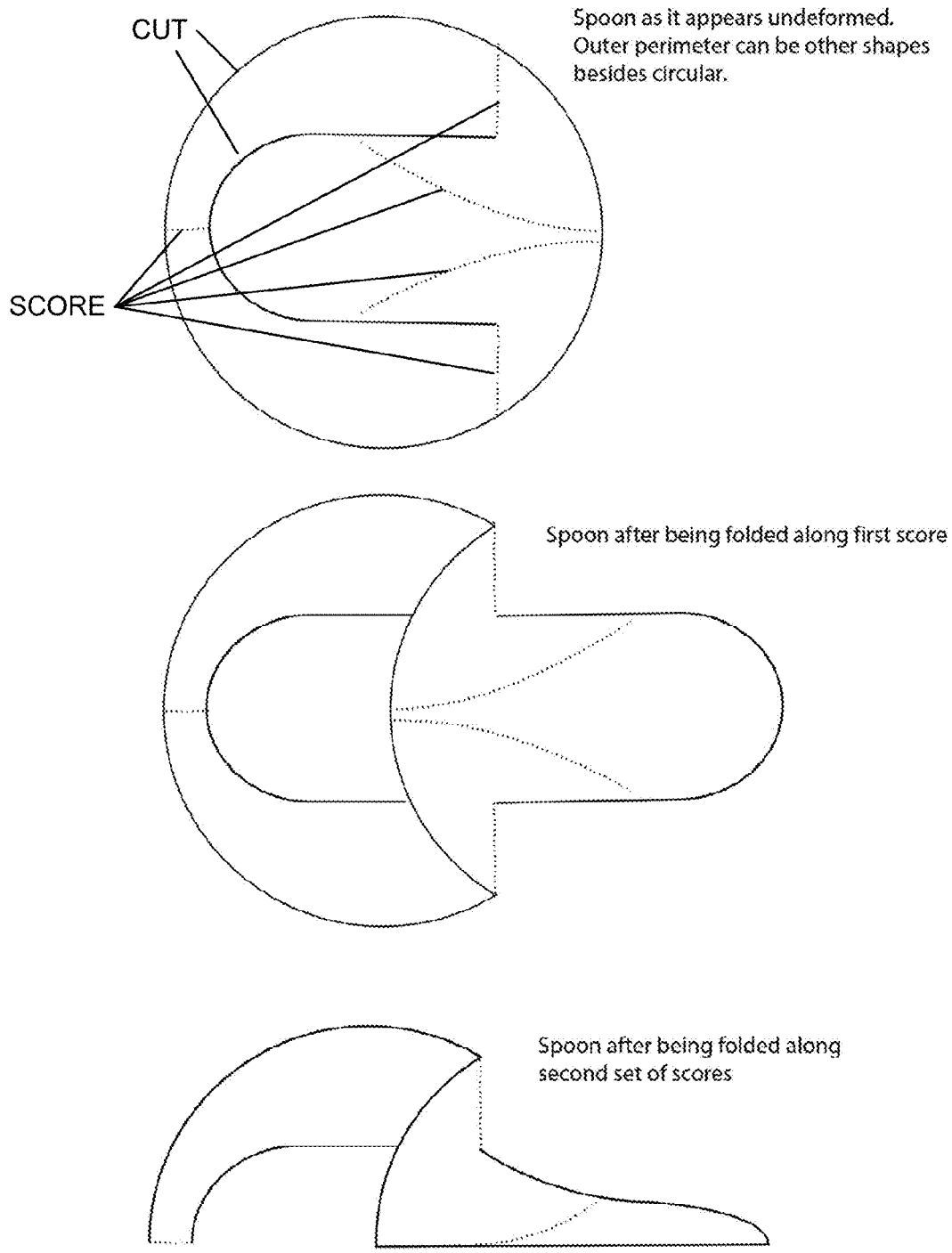

FIG. 31 illustrates a construction sequence for a constructible utensil including an exterior perimeter and a score pattern configured to produce a novel spoon lid utensil. The incorporated patent documents include description and illustrations of several different spoon lids. The products can have a handle portion having a perimeter matching the container opening/lid shape and a functional extension that is foldably attached to the handle portion. Unfolding the functional extension and folding the handle portion creates an extended bowl-portion suitable for reaching into the container and consuming the foodstuff contained within. Those solutions offer the advantage of a small pre-constructed footprint with the ability to have a greater length when constructed. In some instances the folding process increases unit costs due to the folding step and addition of any releasable adhesive securing the functional extension in the folded configuration to be ready for use. And as compared to the constructible utensil illustrated in FIG. 31, such a system includes "extra" material that is not used by the embodiment of FIG. 31.

The constructible utensil of FIG. 31 includes a paperboard (or other suitable foundation material) blank shaped to match the intended packing location (which for this implementation is under a lid to help maintain the constructible utensil in a clean and sanitary condition but other locations are possible). The perimeter can thus be shaped to match the container mounting/attachment location, frequently it is circular such as for a yogurt container. Other perimeter shapes are possible and as varied as possible opening shapes.

The desired perimeter shape is cut and a number of interior scores and cuts are formed within the blank. The cuts form a bullet-shaped functional portion that is hingedly fixed to the interior of the blank. A pair of lateral scores connecting ends of the cut to the exterior form hinges that allow the bullet-shaped functional portion to be displaced from the plane of the blank and rotated 180 degrees about the hinging lateral scores so the functional portion now extends past the opening-shaped perimeter. Scores on the functional include a typical curved score pattern that are symmetric about a fold axis. That fold axis is aligned with a score on the interior portion of the blank and thus allows the structure to be easily folded about the fold axis to produce a constructed utensil for use with the container. The constructible utensil thus saves material and folding costs as compared to the reference spoonlid system described herein.

Figure 32:
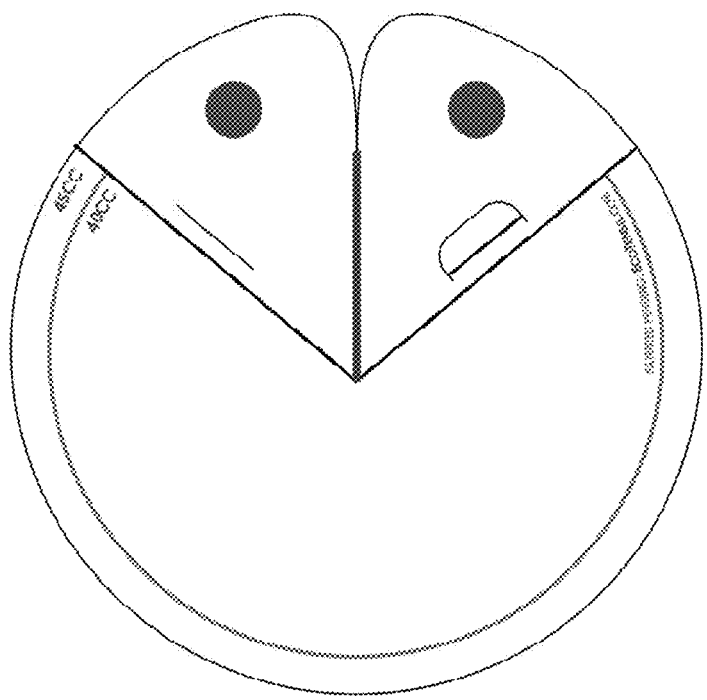
FIG. 32 illustrates a measurelid with a locking mechanism.
Figure 32:
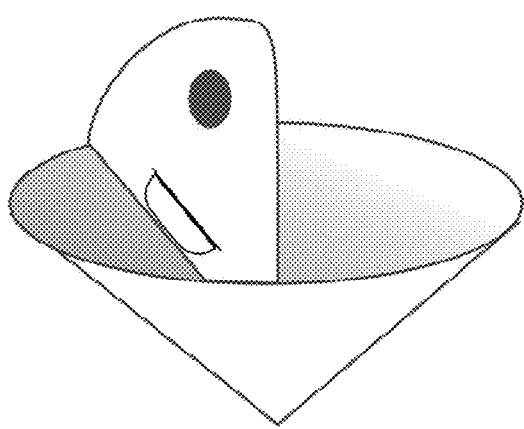

FIG. 32 illustrates a measurelid with a locking mechanism to secure a constructed utensil into the constructed mode. As illustrated, the locking mechanism includes a cut tab and a complementary slit to receive the tab when the tab is folded out (with an assembled version also illustrated in the figure).

Figure 33:
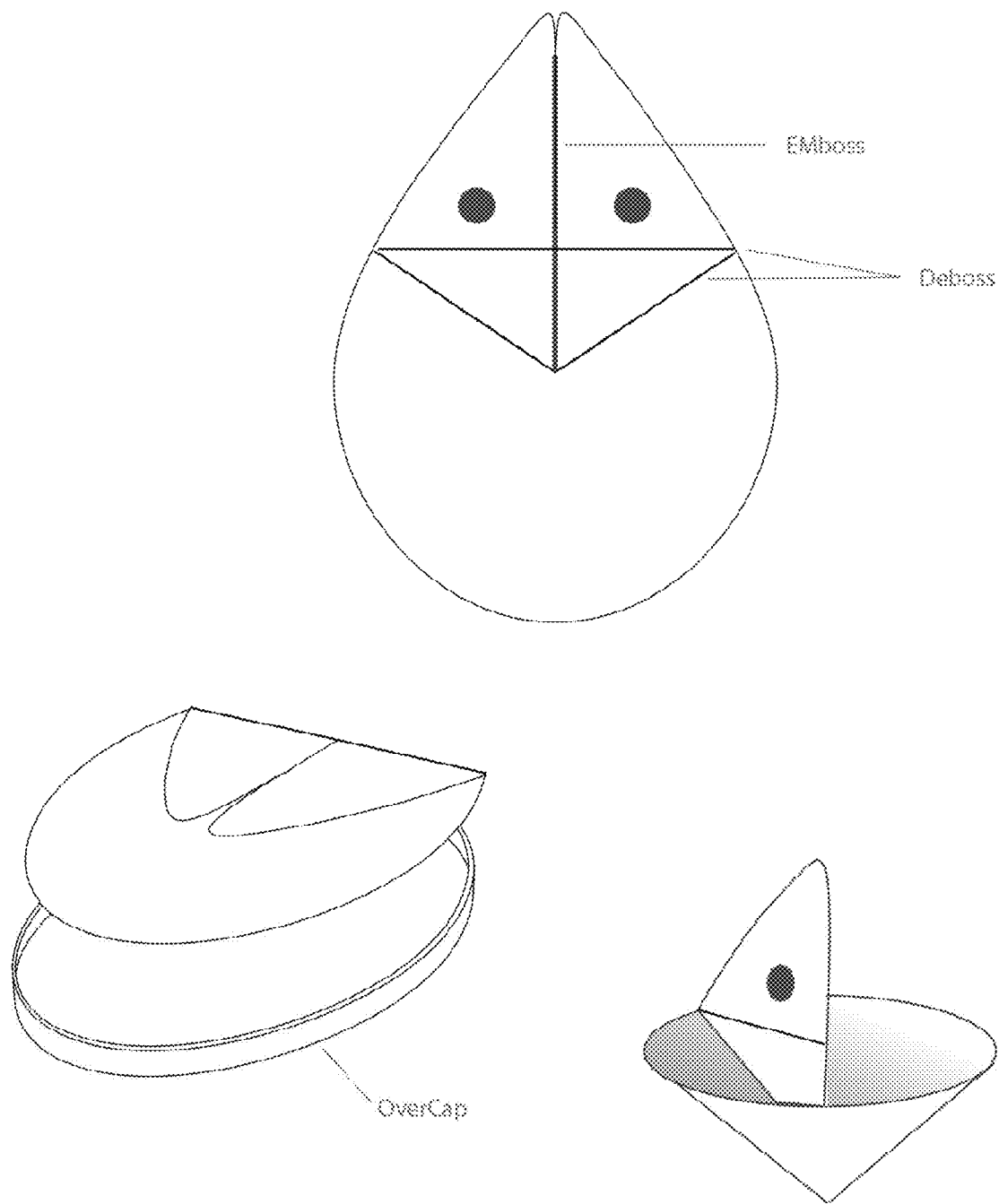
FIG. 33 illustrates a measurelid with extended handle for dipping into deeper canister.

FIG. 33 illustrates a measurelid with extended handle for dipping into deeper canister. The measurelid includes a generally circular perimeter having a pair of extended legs to allow use with a deeper canister. As illustrated, a perpendicular (to a fold axis) score is included to allow the extended legs to fold with respect to the handle to allow an efficient and safe pack out in which the folded pre-constructed measurelid (and/or scoop) may be installed between an overcap and a freshness seal for container.

In some cases, a consumer may not easily understand a preferred folding pattern when a constructible utensil includes a plurality of scores such as the structure of FIG. 33. To help with this, the score pattern includes both a number of embossed and debossed scores. In general, a deboss score is produced to encourage an associated fold to go "down" and an emboss score encourages an associated score to up. For example, deboss presses the score down into the paper, so you have a depression or trough. EMboss presses the score up from below, so you have a bump or ridge.

Figure 34:
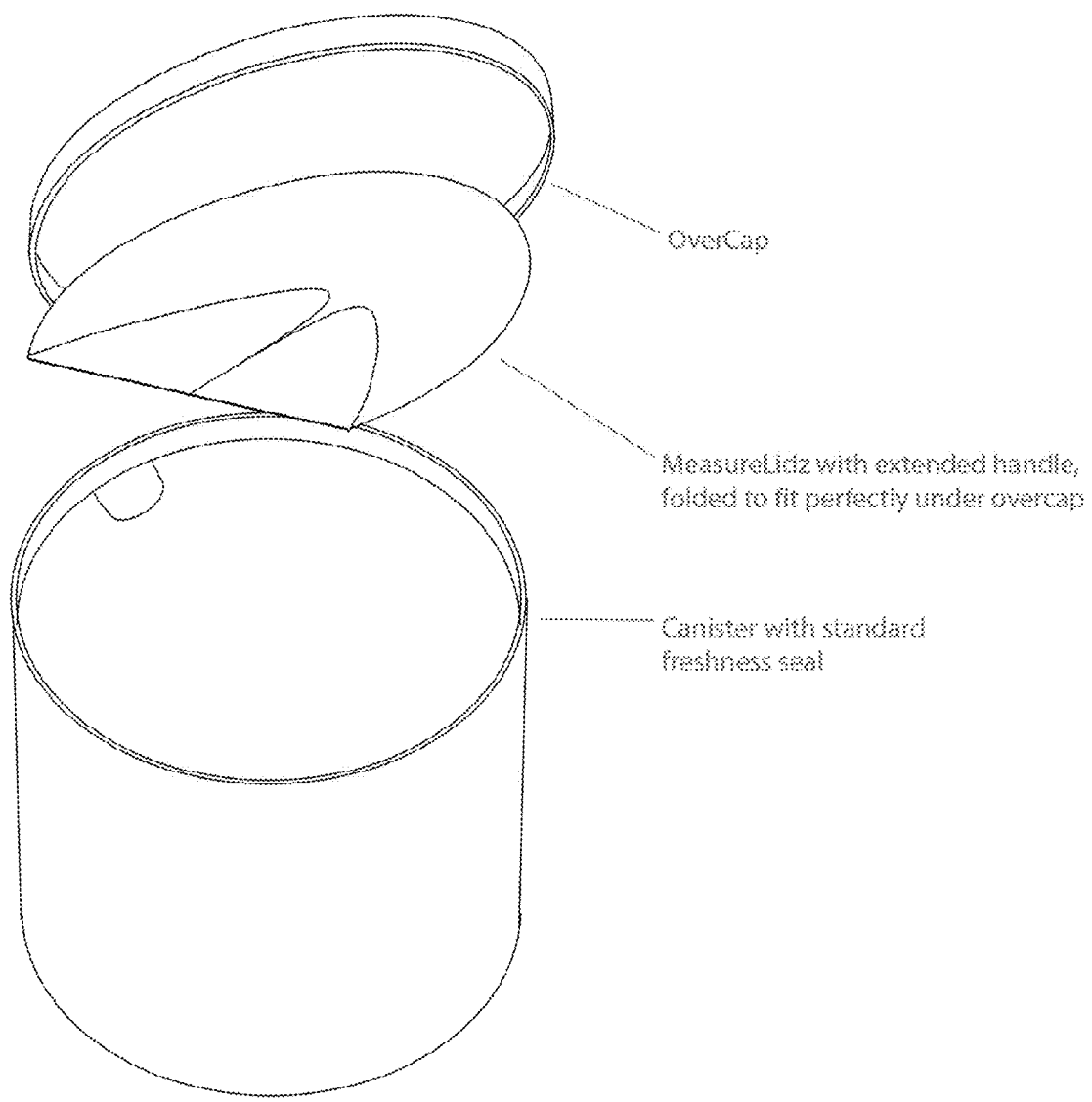
FIG. 34 illustrates a representative installation of a measurelid on a package with scoopable product.

FIG. 34 illustrates a representative installation of a measurelid on a package with scoopable product.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letter Patent of the United States is:

1. A constructible tool, comprising:
a planar body of a deformable foldable stock defining a handle portion joined to a bowl portion, said handle portion including a rear lateral edge and a longitudinal axis dividing said planar body into two general symmetrical halves; and
a plurality of scores disposed on said planar body including a longitudinal score extending from said rear lateral edge along said longitudinal axis towards a front lateral edge opposite said rear lateral edge and terminating at a vertex, a pair of handle scores each extending from said vertex back towards rear lateral edge on opposing sides of said longitudinal axis, and a pair of tool scores extending from said vertex towards said front lateral edge on opposing sides of said longitudinal axis; and
wherein said pair of tool scores produce a bowl-forming arrangement responsive to a folding of said planar body about said longitudinal axis; and
wherein said pair of handle scores produce a dam-forming arrangement in cooperation with said longitudinal score configured to deploy a backstop proximate said rear lateral edge.

2. The constructible tool of claim 1 wherein said handle portion includes a pair of construction indicia.

3. The constructible tool of claim 2 wherein a tacky adhesive is disposed on a bottom surface portion of said planar body corresponding to a location of said pair of construction indicia.

4. The constructible tool of claim 1 wherein said foldable deformable stock includes a paperboard stock greater than 10 point caliper thickness, and preferably in a range of 14-18 point caliper.

5. The constructible tool of claim 4 wherein said paperboard stock includes a coating of a moisture barrier material.

6. The constructible tool of claim 1 wherein said pair of tool scores include a pair of curved scores converging from said front lateral edge towards said vertex.

7. The constructible tool of claim 1 wherein said dam-forming arrangement is separately configurable to form said backstop independent with respect to said bowl-forming arrangement with said backstop optional after formation of said bowl by said bowl-forming arrangement.

8. The constructible tool of claim 5 wherein said dam-forming arrangement is separately configurable to form said backstop independent with respect to said bowl-forming arrangement with said backstop optional after formation of said bowl by said bowl-forming arrangement.

9. The constructible tool of claim 6 wherein said dam-forming arrangement is separately configurable to form said backstop independent with respect to said bowl-forming arrangement with said backstop optional after formation of said bowl by said bowl-forming arrangement.

10. A method of constructing a tool, comprising:
a) folding a paperboard blank along a longitudinal axis with said paperboard blank including a planar body of a deformable foldable stock defining a handle portion joined to a scoop portion, said handle portion including a rear lateral edge and a longitudinal axis dividing said planar body into two general symmetrical halves, and a plurality of scores disposed on said planar body including a longitudinal score extending from said rear lateral edge along said longitudinal axis towards a front lateral edge opposite said rear lateral edge and terminating at a vertex, a pair of handle scores each extending from said vertex back towards rear lateral edge on opposing sides of said longitudinal axis, and a pair of tool scores extending from said vertex towards said front lateral edge on opposing sides of said longitudinal axis; and
wherein said pair of tool scores produce a bowl-forming arrangement responsive to a folding of said planar body about said longitudinal axis and wherein said pair of handle scores produce a dam-forming arrangement in cooperation with said longitudinal score configured to deploy a backstop proximate said rear lateral edge;
b) producing, in response to said a folding step a), a bowl in said bowl portion without an automatic deployment of said backstop; and c) deploying, independent from said production of said bowl in said bowl portion of producing step b), said backstop.

11. A constructible utensil, comprising:

a planar body of a deformable foldable stock including a handle portion joined to a tool portion, said planar body defining a back free edge, a front free edge opposite of and spaced apart from said back free edge, a longitudinal axis extending from said back free edge to said front free edge, and a pair of lateral free edges extending, on opposite sides of said longitudinal axis, from said back free edge to said front free edge with said longitudinal axis dividing said planar body into two general symmetrical halves; and a plurality of scores disposed on said planar body including a longitudinal score extending from said back free edge along said longitudinal axis towards said front free edge and terminating at a vertex, a pair of handle scores on said handle portion with said handle scores extending from said vertex back towards said back free edge on opposing sides of said longitudinal score, and a pair of tool scores on said tool portion with said tool scores extending from said vertex towards said front free edge on opposing sides of said longitudinal axis; and wherein said pair of tool scores are configured to produce a bowl-like depression within said tool portion responsive to a tool-forming fold of said tool portion about said longitudinal axis; and wherein said pair of handle scores are configured to deploy a backstop proximate said back free edge responsive to a backstop-forming fold of said handle portion along said longitudinal axis, said backstop-forming fold independent from said tool-forming fold; and wherein said planar body is configurable in one of four different modes, including a first mode not including either said bowl-like depression and not including said backstop, a second mode including said bowl-like depression and not including said back stop, a third mode including said backstop and not including said bowl-like depression, and a fourth mode including both said bowl-like depression and said backstop.

12. The constructible utensil of claim 11 wherein said pair of tool scores include a pair of curved scores converging from said front lateral edge towards said vertex.

* * * * *